United States Patent
Byun et al.

(10) Patent No.: US 9,519,325 B2
(45) Date of Patent: Dec. 13, 2016

(54) APPLICATION PROCESSORS, MOBILE DEVICES INCLUDING THE SAME AND METHODS OF MANAGING POWER OF APPLICATION PROCESSORS

(71) Applicants: Yong-Ki Byun, Osan-si (KR); Dong-Han Lee, Seongnam-si (KR); Jae-Sop Kong, Gwacheon-si (KR)

(72) Inventors: Yong-Ki Byun, Osan-si (KR); Dong-Han Lee, Seongnam-si (KR); Jae-Sop Kong, Gwacheon-si (KR)

(73) Assignee: Samsung Electronics Co., Ltd. (KR)

( * ) Notice: Subject to any disclaimer, the term of this patent is extended or adjusted under 35 U.S.C. 154(b) by 241 days.

(21) Appl. No.: 14/283,948

(22) Filed: May 21, 2014

(65) Prior Publication Data

US 2015/0033047 A1 Jan. 29, 2015

(30) Foreign Application Priority Data

Jul. 24, 2013 (KR) ........................ 10-2013-0087450

(51) Int. Cl.
| | | |
|---|---|---|
| *G06F 1/32* | (2006.01) | |
| *G09G 5/00* | (2006.01) | |
| *G09G 5/36* | (2006.01) | |
| *G09G 5/39* | (2006.01) | |

(52) U.S. Cl.
CPC ............. *G06F 1/3206* (2013.01); *G06F 1/325* (2013.01); *G09G 5/006* (2013.01); *G09G 5/36* (2013.01); *G09G 5/39* (2013.01); *G09G 2320/103* (2013.01); *G09G 2330/021* (2013.01); *G09G 2360/18* (2013.01)

(58) Field of Classification Search
CPC .. G06F 1/3206; G06F 1/325; G09G 2320/103; G09G 2330/021; G09G 2360/18; G09G 5/36
USPC .................................................. 713/300, 320
See application file for complete search history.

(56) References Cited

U.S. PATENT DOCUMENTS

| | | | |
|---|---|---|---|
| 6,346,972 | B1 | 2/2002 | Kim |
| 6,657,634 | B1 | 12/2003 | Sinclair et al. |
| 6,680,738 | B1 | 1/2004 | Ishii et al. |
| 7,245,945 | B2 | 7/2007 | Paver et al. |
| 7,250,927 | B2 | 7/2007 | Yamazaki et al. |
| 7,256,788 | B1 | 8/2007 | Luu et al. |
| 7,590,815 | B1 | 9/2009 | De Waal |
| 7,734,943 | B2 | 6/2010 | Whelan et al. |
| 7,770,040 | B2 | 8/2010 | Aleksic et al. |

(Continued)

FOREIGN PATENT DOCUMENTS

| | | |
|---|---|---|
| JP | 2007-121699 | 5/2007 |
| JP | 2012-181540 | 9/2012 |

(Continued)

*Primary Examiner* — Zahid Choudhury
(74) *Attorney, Agent, or Firm* — Myers Bigel, P.A.

(57) ABSTRACT

An application processor includes a memory controller, a display block and a power management unit. The memory controller controls an external memory that stores an image signal to be displayed on a display unit. The display block includes an internal frame buffer and a display controller and the display controller controls the image signal to be displayed on the display unit. The power management unit adaptively controls a power mode of the application processor based on a characteristic of the image signal to be displayed and a power control overhead index.

18 Claims, 20 Drawing Sheets

(56) References Cited

U.S. PATENT DOCUMENTS

| | | |
|---|---|---|
| 7,995,024 B2 | 8/2011 | Koyama et al. |
| RE43,235 E | 3/2012 | Ishii et al. |
| 8,218,022 B2* | 7/2012 | Kawamura ............ H04N 5/232 |
| | | 348/220.1 |
| 8,284,179 B2 | 10/2012 | Chen |
| 8,289,306 B2 | 10/2012 | Unger |
| 2006/0121936 A1 | 6/2006 | Paver et al. |
| 2007/0109292 A1* | 5/2007 | Dahan .................... G09G 5/363 |
| | | 345/211 |
| 2008/0079739 A1 | 4/2008 | Gupta et al. |
| 2008/0079756 A1 | 4/2008 | Akai et al. |
| 2008/0100636 A1 | 5/2008 | Lai et al. |
| 2008/0143695 A1* | 6/2008 | Juenemann .......... G09G 3/3611 |
| | | 345/204 |
| 2010/0040299 A1 | 2/2010 | Noh et al. |
| 2010/0131787 A1* | 5/2010 | White .................... G06F 1/3203 |
| | | 713/322 |
| 2010/0225657 A1 | 9/2010 | Sakariya et al. |
| 2010/0253836 A1 | 10/2010 | Huang et al. |
| 2011/0148923 A1 | 6/2011 | Sadowski et al. |
| 2011/0163977 A1 | 7/2011 | Barnhoefer et al. |
| 2011/0242116 A1 | 10/2011 | Nath et al. |
| 2011/0249022 A1 | 10/2011 | Poornachandran et al. |
| 2012/0036382 A1 | 2/2012 | Tung et al. |
| 2013/0016114 A1 | 1/2013 | Rabii |
| 2013/0235055 A1 | 9/2013 | Kim et al. |

FOREIGN PATENT DOCUMENTS

| | | |
|---|---|---|
| KR | 1020010035842 A | 5/2001 |
| KR | 1020040062102 A | 7/2004 |
| KR | 101158876 B1 | 6/2012 |

\* cited by examiner

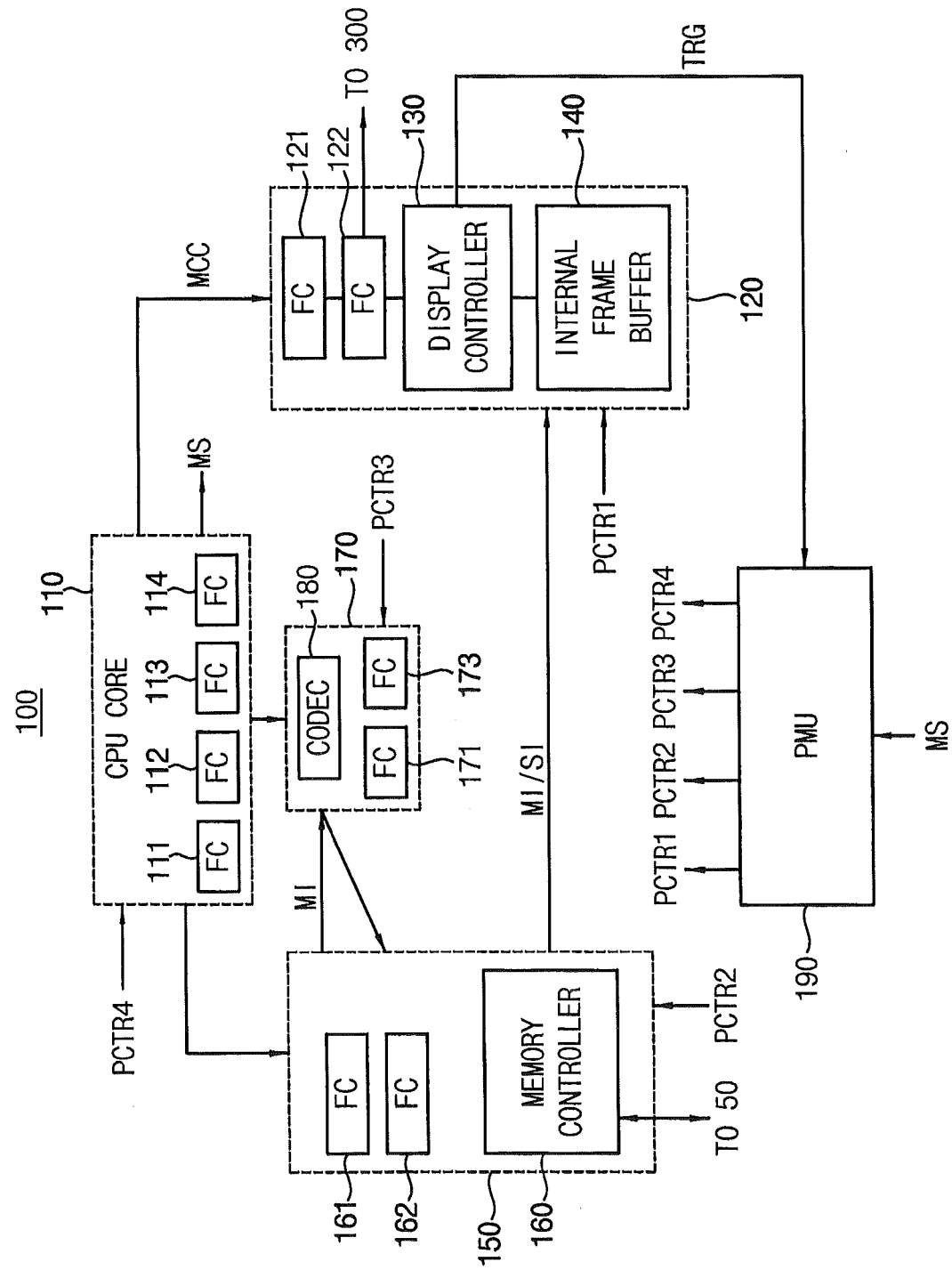

FIG. 5

| | TOP PD | MEM_CON PD | EXT_MEM | DISPLAY PD | POWER | ON/OFF OT |
|---|---|---|---|---|---|---|
| NORMAL | ON | ON | ON | ON | 5 | 1 |
| TOP-GATING | PG | ON | ON | ON | 4 | 2 |
| TOP-OFF | OFF | PG | ON | ON | 2 | 3 |
| MEM-GATING | OFF | PG | PG | ON | 1 | 4 |
| MEM-AON | OFF | ON | ON | ON | 3 | 1 |

LPD1 { TOP-GATING, TOP-OFF }
LPD2 { MEM-GATING, MEM-AON }

5>4>3>2>1

APPLICATION PROCESSORS, MOBILE DEVICES INCLUDING THE SAME AND METHODS OF MANAGING POWER OF APPLICATION PROCESSORS

CROSS-REFERENCE TO RELATED APPLICATION

This application claims priority under 35 USC §119 to Korean Patent Application No. 10-2013-0087450, filed on Jul. 24, 2013 in the Korean Intellectual Property Office (KIPO), the disclosure of which is incorporated herein by reference in its entirety.

BACKGROUND

Example embodiments relate generally to power management, and more particularly to application processors, mobile devices including the same and methods of managing power of an application processors.

Data traffic between a mobile application processor and a display driver integrated circuit (IC) is becoming dramatically increased in response to improvements in image resolution. As a result, power consumed at the mobile application processor and/or the display driver IC is steadily increasing.

The mobile application processor is built in various multimedia devices and the mobile application processor processes multimedia data such as still image signals or moving image signals. In general, the mobile application processor consumes more and more power as the multimedia data that are transmitted to the mobile application processor more and the mobile application processor includes more functional blocks that are provided with power, which arises time for which a battery may be used with one charge.

SUMMARY

Some example embodiments provide an application processor capable of reducing power consumption.

Some example embodiments provide a mobile device including the application processor.

Some example embodiments provide a method of managing power of an application processor, capable of reducing power.

According to some example embodiments, an application processor includes a memory controller, a display block and a power management unit. The memory controller controls an external memory that stores an image signal to be displayed on a display unit. The display block includes an internal frame buffer and a display controller and the display controller controls the image signal to be displayed on the display unit. The power management unit adaptively controls a power mode of a first power domain, a second power domain and a top power domain based on a characteristic of the image signal to be displayed and a power control overhead index. The display block belongs to the first power domain, the memory controller belongs to the second power domain, and the top power domain is excluded from the first and second power domains.

In some embodiments, the power management unit controls the power mode such that the first, second and top power domains operate in one of a plurality of low power modes having different power depth with respect to each other when the image signal to be displayed is a still image signal.

The plurality of low power modes include first and second low power modes which are divided according to a characteristic of the still image signal and the power control overhead index.

The power management unit controls the power mode such that the first, second and top power domains operate in one of the first and second low power modes based on a memory resource of the internal frame buffer and a memory request amount of the still image signal.

The power management unit controls the power mode such that the first, second and top power domains operate in the second low power mode when the memory resource is smaller than the memory request amount.

The still image signal is provided from the external memory to the display unit via a second data path including the memory controller and the display controller in the second low power mode.

The power management unit provides the first and second power domains with corresponding powers, provides a data path domain in the power domain with corresponding powers and cuts off powers to a remaining domain in the power domain in the second low power mode. The data path domain and the remaining domain constitutes the top power domain, and the data path domain is domains through which the second data path passes.

The application processor exits from the second low power mode and enters into a normal mode when the still image signal is to be updated.

The power management unit controls the power mode such that the first, second and top power domains operate in the first low power mode when the memory resource is greater than the memory request amount.

The still image signal is provided from the external memory to the display unit via a first data path including the memory controller, the internal frame buffer and the display controller in the first low power mode.

The first low power mode includes a plurality of sub low power modes having different power depth with respect to each other based on the characteristic of the still image signal and the power control overhead index.

The respective sub low power modes have respective power depths different from each other according to power consumption in each of the sub low power modes.

The still image signal is provided to the display unit using the internal frame buffer in the first low power mode.

A portion of the still image signal stored in the external memory is copied to the internal frame buffer in the first low power mode, and the power management unit controls the power mode such that the first, second and top power domains operate in one of the sub low power modes until the portion of the still image copied to the internal frame buffer is consumed to a predetermined reference amount.

The display controller provides the power management unit with an activated trigger signal when the portion of the still image copied to the internal frame buffer is consumed to the predetermined reference amount.

The power management unit provides corresponding powers to power domains associated with copying the still image signal to the internal frame buffer, in response to the activated trigger signal.

The application processor exits from the first low power mode and enters into a normal mode when the all of the still image signal copied to the internal frame buffer is provided to the display unit or when the still image signal is to be updated.

In some embodiments, the application processor may further include a central processing unit (CPU) core. The CPU core generates a mode signal indicating whether the image signal to be displayed is a still image signal or a moving image signal.

According to some example embodiments, a mobile device includes a display unit, an external memory and an application processor. The display unit displays an image signal. The external memory stores the image signal to be displayed. The application processor transmits the image signal to be displayed to the display unit. The application processor includes a memory controller, a display block and a power management unit. The memory controller controls the external memory. The display block includes an internal frame buffer and a display controller and the display controller controls the display unit. The power management unit adaptively controls a power mode of a first power domain, a second power domain and a top power domain based on a characteristic of the image signal to be displayed and a power control overhead index. The display block belongs to the first power domain, the memory controller belongs to the second power domain, and the top power domain is excluded from the first and second power domains.

In some embodiments, the display unit includes a display panel and a display driver. The display panel displays the image signal. The display driver transmit the image signal to the display panel, and the display driver transmits the image signal to the display panel via different paths depending on whether the image signal is a still image signal or a moving image signal.

In some embodiments, the power management unit controls the power mode such that the first, second and top power domains operate in one of a plurality of low power modes having different power depth with respect to each other when the image signal to be displayed is a still image signal, and the plurality of low power modes include first and second low power modes which are divided according to a characteristic of the still image signal and the power control overhead index.

According to some example embodiments, in a method of managing power of an application processor, whether an image signal to be displayed on a display unit is a still image signal or a moving image signal is determined. A power mode of a first power domain, a second power domain and a top power domain except the first and second power domains is adaptively controlled, in a power management unit, based on a characteristic of the image signal to be displayed and a power control overhead index when the image signal to be displayed is the still image signal. The display block belongs to the first power domain, the memory controller belongs to the second power domain, and the top power domain is excluded from the first and second power domains. The display block includes a display controller configured to transmit the image signal to be displayed to the display unit, and the memory controller controls an external memory that stores the image signal to be displayed.

In some embodiments, the power management unit controls the power mode such that the first, second and top power domains operate in one of a plurality of low power modes having different power depth with respect to each other when the image signal to be displayed is a still image signal.

The plurality of low power modes include first and second low power modes which are divided according to a characteristic of the still image signal and the power control overhead index.

The image signal to be displayed is provided to the display unit using the internal frame buffer in the first low power mode, and the image signal to be displayed is provided to the display unit without using the internal frame buffer in the second low power mode.

Accordingly, the application processor may reduce power consumption by controlling the power mode of power domains of the application processor such that the power domains operate in one of a plurality of low power modes having different power depths with respect to each other when an image signal to be displayed on the display panel is a still image signal.

BRIEF DESCRIPTION OF THE DRAWINGS

Features will become apparent to those of ordinary skill in the art by describing in detail exemplary embodiments with reference to the attached drawings in which:

FIG. 2 is a block diagram illustrating the application processor in FIG. 1 according to some example embodiments.

FIG. 5 is a table illustrating operation modes of the application processor of FIG. 2.

DETAILED DESCRIPTION OF THE EMBODIMENTS

Figure 1:
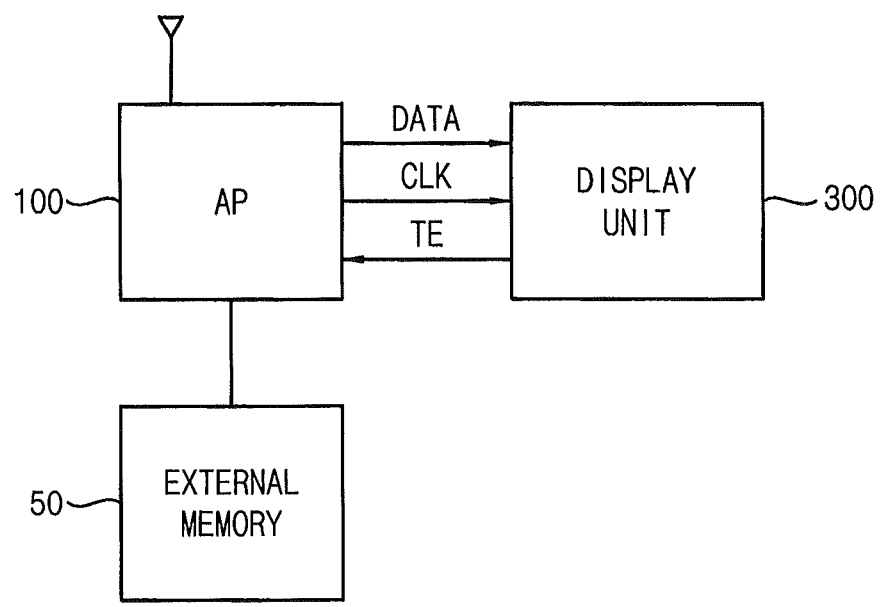
FIG. 1 is a block diagram illustrating an image signal processing system (or a mobile device) according to some example embodiments.

Various example embodiments will be described more fully with reference to the accompanying drawings, in which embodiments are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, according to example embodiments will be described in detail with reference to accompanying drawings. The same reference numerals will be assigned to the same elements, and the details thereof will be omitted in order to avoid redundancy.

FIG. 1 is a block diagram illustrating an image signal processing system (or a mobile device) according to some example embodiments.

Referring to FIG. 1, a mobile device 10 may be mobile phone, a smart phone, a tablet personal computer (PC), a personal digital assistant (PDA) or a portable multimedia player (PMP), a handheld device or a handheld computer 10 which may display a still image signal (or a still image) or a moving image signal (or a moving image) on a display unit 300.

The mobile device 10 includes an application processor 100, an external memory 50 and a display unit 300.

The application processor 100 may transmit to the display unit 300 an image signal DATA to be displayed in the display unit 300 based on whether or not codec embodied in the application processor 100 is performed. The image signal DATA may include a mode change command indicating whether the image signal DATA to be displayed is a still image signal or a moving image signal.

The image signal DATA may be transmitted to a display driver in the display unit 300 in response to a clock signal CLK.

The application processor 100 may receive a tearing effect (TE) control signal TE output from the display unit 300 (more particularly, the display driver) and control generation timing or transmission timing of the image signal DATA based on a received TE control signal TE. The TE control signal TE may be a control signal for mitigating (or alternatively, preventing) screen tearing.

The display unit 300 may select one of a first interface that processes a still image signal and a second interface that processes a moving image signal, process the image signal DATA and output the processed image signal as an output image signal to a display panel in the display unit 300 through the selected interface in response to a mode change command output from the application processor 100. The first and second interfaces may be implemented in the display driver in the display unit 300.

The external memory 50 may store the image signal to be displayed in the display unit 300.

FIG. 2 is a block diagram illustrating the application processor in FIG. 1 according to some example embodiments.

Referring to FIG. 2, the application processor 100 includes a central processing unit (CPU) core 110, a display block 120, a memory control block 120, an image processing block 170 and a power management unit (PMU) 190.

The CPU core 110 may include a plurality of functional circuits (FC)s 111~114, and each of the FCs 111~114 may be processing core. That is, the CPU core 110 may be a multi-core processor.

The display block 120 may include a display controller 130, an internal frame buffer 140 and a plurality of display FCs 121 and 122. The display FC 121 may be a register and the display FC 122 may be an interface.

The memory control block 150 may include a memory controller 160 that controls the external memory 50 and memory FCs 161 and 162. The memory FC 161 may be a volatile memory and the memory FC 162 may be a non-volatile memory such as a flash memory.

The image processing block 170 may include image processing FCs 171 and 173 and a codec 180. Here, FC means a functional circuit, logic or combination of these which may be integrated in the mobile device 10, e.g., a system-on-chip (SoC). In addition, a code may be stored in the SoC.

For example, an FC may include, but is not limited to, a central processing unit (CPU), each of a plurality of cores in the CPU, a multi-format codec (MFC), a video module (e.g., a camera interface, a joint photographic experts group (JPEG) processor, a video processor or a mixer and so one), a 3-dimensional (3D) graphic core, an audio system, a driver, a display driver, a volatile memory, a non-volatile memory, a memory controller, and/or a cache memory.

The CPU core 110, which controls the overall operation of the application processor 100, controls the operations of the display block 120, the memory control block 150, the image processing block 170 and the PMU 190 and executes an execution code that is loaded to the memory FC 161.

When a user plays a moving image signal MI on the display unit 300, that is, when the codec 180 is operated (or executed) by the execution code, the CPU core 110 detects the operation (or execution) of the codec 180, generates a mode change command MCC according to a detection result, and transmits the mode change command MCC to the register 121.

For example, when an event related to playback of the moving image signal MI occurs, an event handler function related to the event is called from the main function of the execution code. When the event handler function calls the codec 180, the CPU core 110 determines that an image signal to be displayed on the display unit 300 is the moving image signal MI based on the execution of the execution code and/or the call.

The PMU 190 controls the power mode of the display block 130, the memory control block 150 and the image processing block 170 such that the application processor 100 operates in a normal mode in response to a mode signal MS indicating that the image signal to be displayed on the display unit 300 is a moving image signal MI.

When a user plays a still image signal SI on the display unit 300, e.g., when the operation of the codec 180 is terminated by the execution code or when the codec 180 is not operated, the CPU core 110 detects the termination of the operation of the codec 180 or the non-operation of the codec 180, generates the mode change command MCC according to a detection result, and transmits the mode change command MCC to the register 121.

For instance, when the operation of the codec 180 is terminated by an end event and the event handler function called to drive (or execute) the codec 180 is returned to the main function in order to display the still image signal SI on the display unit 300, the CPU core 110 detects the return and determines that an image signal to be displayed on the display 300 is the still image signal SI.

When the application processor 100 is booted, the execution code stored in the memory FC 162 is loaded to the memory FC 161. The execution code loaded to the memory FC 161 is sequentially executed. The execution code stored in the memory FC 162 may be loaded to the memory FC 161 in real time according to the control of the CPU core 110.

The memory FC 162 may store a still image signal, a moving image signal, a game program, a start program, e.g., an execution code, and/or an application. The still image signal, the moving image signal, the game program, the start program, e.g., the execution code, and/or the application stored in the memory FC 162 may be loaded to the memory FC 161 according to the control of the CPU core 110.

The codec 180 may be a hardware or a computer program that can encode and/or decode a data stream or a signal. For instance, the codec 180 decodes the moving image signal MI received from the memory control block 150 and transmits a decoded moving image signal to the memory control block 150.

The display controller 130 controls the transmission of the still image signal SI or the moving image signal MI from the memory control block 150 to the interface 122.

The interface 122 transmits the clock signal CLK and the image signal DATA, e.g., a still image signal or a moving image signal, to the display unit 300. According to the control of the display controller 130, the interface 122 converts a still image signal into a signal suitable to the command mode and converts a moving image signal into a signal suitable to the video mode.

The interface 122 may convert a still image signal into a signal suitable to the command mode and convert a moving image signal into a signal suitable to the video mode with reference to the mode change command MCC stored in the register 121.

The interface 122 also transmits the TE control signal TE from the display unit 300 to the CPU core 110. In response to the TE control signal TE, the CPU core 110 may control the operation of the interface 122 to control the generation timing of the mode change command MCC and/or the transmission timing of the image signal DATA.

When the mode signal MS indicates that an image signal to be displayed on the display unit 300 is a still image signal, the PMU 190 adaptively controls the power mode of the display block 120, the memory control block 150 and the image processing block 170 such that the application processor 100 operates in one of a plurality of low power modes, in response to the mode signal MS.

The PMU 190 may adaptively control the power mode of power domains of the display block 120, the memory control block 150 and the image processing block 170 based on the characteristic of the image signal to be displayed on the display unit 300 and a power control overhead index. A power domain is a group of physical resources that are controlled with a common power signal. Thus, power to all of the physical resources in a power domain can be turned off or gated together.

The power control overhead index refers to a time required for the application processor 100 to transition from one of a plurality of low power modes to another low power mode or to the normal mode. A large power control overhead index means that more time is required for application processor 100 to transition from one of a plurality of low power modes to another low power mode or to the normal mode, and small power control overhead index means that less time is required for application processor 100 to transition from one of a plurality of low power modes to another low power mode or to the normal mode. In addition, each of the low power modes may different power depth with respect to each other. Here, the power depth means power consumed in each of the low power modes. Deep power depth means that less power is consumed in corresponding low power mode and shallow power depth means that more power is consumed in corresponding low power mode. For example a power depth of the normal mode may be more shallow than a power depth of each of the low power modes.

When the mode signal MS indicates that an image signal to be displayed on the display unit 300 is a still image signal, the PMU 190 adaptively controls the power mode of the display block 120, the memory control block 150 and the image processing block 170 such that power domains of the display block 120, the memory control block 150 and the image processing block 170 operate in one of a plurality of low power modes having different power depths respectively, in response to the mode signal MS.

The plurality of low power modes may include at least first and second low power modes which are divided according to the characteristic of the image signal to be displayed and the power control overhead index. The PMU 190 may control the power mode such that that the power domains of the display block 120, the memory control block 150 and the image processing block 170 operate in one of the first and second low power modes based on memory resources of the internal frame buffer 140 and a memory request amount of the still image signal to be displayed. Here, the memory request amount means an amount of memory required for the still image signal to be displayed. Here, the memory resource of the internal frame buffer 140 means an amount of data that the internal frame buffer 140 is capable of storing.

When the memory resource of the internal frame buffer 140 is smaller than the memory request amount of the still image signal to be displayed, the PMU 190 may control the power mode such that that the power domains of the display block 120, the memory control block 150 and the image processing block 170 operate in the second low power mode.

In the second low power mode, a still image signal stored in the external memory 50 may be transmitted to the display unit 300 without using the internal frame buffer 140 in the display block 120. In the second low power mode, the still image signal stored in the external memory 50 may be transmitted to the display unit 300 via a second data path including the memory controller 160 and the display controller 130. When the still image signal stored in the external memory 50 is transmitted to the display unit 300 via the second data path, the PMU 190 may supply corresponding power to a first power domain to which the display block 120 belongs and a second power domain to which the memory controller 160 (or the memory control block 150) belongs. In addition, the PMU 190 may supply a corresponding power to a data path domain of a top power domain that is excluded from the first and second power domains, and may cut off power to a remaining domain that is excluded from the data path domain.

When the memory resource of the internal frame buffer 140 is greater than the memory request amount of the still image signal to be displayed, the PMU 190 may control the power mode such that that the power domains of the display block 120, the memory control block 150 and the image processing block 170 operate in the first low power mode.

In the first low power mode, a still image signal stored in the external memory 50 may be transmitted to the display unit 300 using the internal frame buffer 140 in the display block 120. In the first low power mode, the still image signal stored in the external memory 50 may be transmitted to the display unit 300 via a first data path including the memory controller 160, the internal frame buffer 140 and the display controller 130. In the first low power mode, a portion of the still image signal stored in the external memory 50 is copied to the internal frame buffer 140, and the PMU 190 controls the power mode such that the power domains of the display block 120, the memory control block 150 and the image processing block 170 operate in the first low power mode.

When the portion of the still image copied to the internal frame buffer 140 is consumed to a predetermined reference amount, the display controller 130 provides the PMU 190 with an activated trigger signal TRG. The PMU 190 provides corresponding power to the power domain of the memory controller 150 in response to the activated trigger signal TRG.

The PMU 190 may repeat supplying corresponding powers to power domains associated with copying the still image signal to the internal frame buffer 140 while the still image signal is being copied to the internal frame buffer 140 and supplying the power only to the display block 120 when the copying the still image signal to the internal frame buffer 140 is completed in the first low power mode. Therefore, the application processor 100 provides the still image signal to the display unit 300 while reducing the power consumption.

The first low power mode may include a plurality of sub low power modes based on the characteristics of the still image signal and the power control overhead index. For example, the sub low power modes may include a first sub low power mode in which corresponding power is supplied to a first power domain to which the display block 120 belongs, a power gating operation is performed on a second power domain to which the memory controller 160 belongs, a power gating operation is performed on the external memory 50 and corresponding power is not supplied (or cut off) to the top power domain. In addition, the sub low power modes may further include a second sub low power mode in which corresponding power is not supplied to the top power domain, corresponding power is supplied to the external memory 50, and corresponding power is supplied to the first power domain. In addition, the sub low power modes may further include a third sub low power mode in which power gating operation is performed on the top power domain and corresponding powers are respectively supplied to the external memory 50 and the first, second and top power domains.

Here, power gating means turning off a transistor connected to a corresponding power domain, but not directly cutting off power supplied to the corresponding power domain. Therefore, when a power gating operation is performed on a power domain, less time may be required for the power domain to transition from the power gating to the normal mode because a regulator is not turned off, which supplies corresponding power to the power domain. Stated differently, in a power gating mode, the regulator that supplies power to a given power domain is not switched off, but rather power is disconnected from the power domain by means of a transistor switch that disconnects the regulator from the power domain.

The PMU 190, in response to the mode signal MS and the trigger signal TRG, may respectively provide first through fourth power mode control signals PCTR1~PCTR4 to the display block 120, the memory control block 150, the image processing block 170 and the CPU core 110. Each of the first through fourth power mode control signals PCTR1~PCTR4 may include a power control signal that determines supply and cut-off of power to a corresponding power domain and a gating control signal.

When the mode signal MS indicates that an image signal to be displayed on the display unit 300 is a moving image signal, the PMU 190 generates the first through fourth power mode control signals PCTR1~PCTR4 such that the application processor 100 operates in the normal mode.

In the normal mode, since FCs in the display block 120 directly access data from the external memory 50 and process accessed data, the internal frame buffer 140 is in idle state. Therefore, an address remapper for remapping addresses from FCs the in the display block 120 may be included in the display block 120 and the internal frame buffer 140 may be shared by the FCs in the display block 120. Accordingly, the cost may be reduced and efficiency of memory utilization may be increased.

Figure 3A:
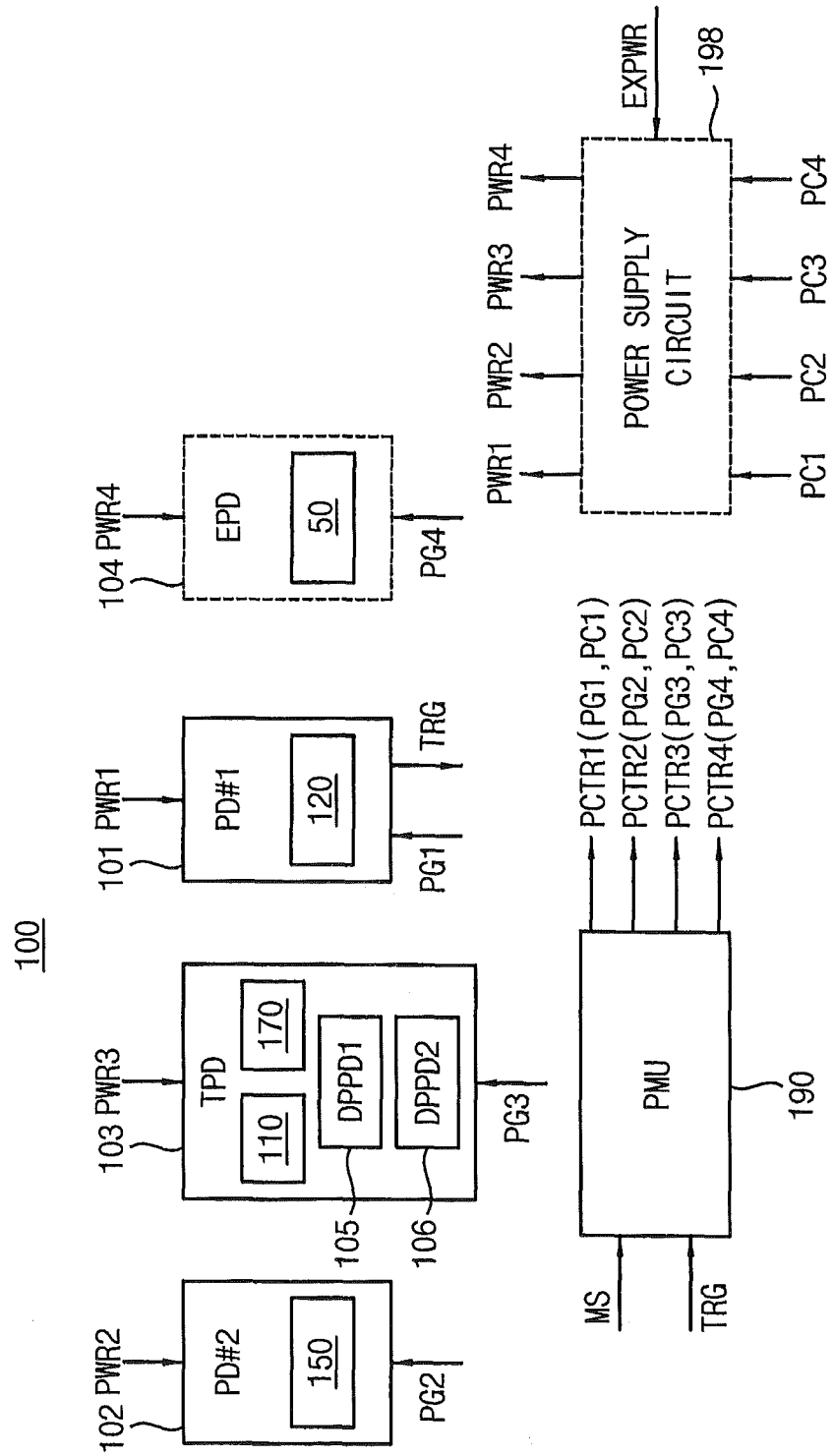
FIG. 3A illustrates the application processor in FIG. 1 in view of power domain.

FIG. 3A illustrates the application processor in FIG. 1 in view of power domain.

Referring to FIG. 3A, the application processor 100 in view of power domain may include the PMU 190 and a plurality of power domains 101, 102, 103 and 104.

A first power domain 101 includes the display block 120, a second power domain 102 includes the memory control block 150, a top power domain 103, excluded from the first and second power domains 101 and 102, includes at least the CPU core 110 and the image processing block 180. An external power domain 104 includes the external memory 50.

The power supply circuit 198 may respectively supply first through fourth powers PWR1~PWR4 to the first power domain 101, the second power domain 102, the top power domain 103 and the external power domain 104, based on an external power EXPWR supplied from a battery.

The PMU 190, in response to the mode signal MS and/or the trigger signal TRG, may respectively provide the first through fourth power mode control signals PCTR1~PCTR4 for controlling the power modes of the power domains 101~104. Each of the first through fourth power mode control signals PCTR1~PCTR4 may include each of power control signals PC1~PC4 for supplying or cutting-off each of the supply first through fourth powers PWR1~PWR4 and each of gating control signals PG1~PG4 for gating the first through fourth powers PWR1~PWR4.

When the mode signal MS indicates that an image signal to be displayed on the display unit 300 is a moving image signal, the PMU 190 respectively provides the first through fourth power mode control signals PCTR1~PCTR4 to the power domains 101~104 such that the power domains 101~104 operate in the normal mode. When the mode signal MS indicates that an image signal to be displayed on the display unit 300 is a moving image signal, the PMU 190 respectively provides the first through fourth power mode control signals PCTR1~PCTR4 to the power domains 101~104 and the power supply circuit 198 such that the first through fourth powers PWR1~PWR4 are respectively provided to the power domains 101~104.

When the mode signal MS indicates that an image signal to be displayed on the display unit 300 is a still image signal, the PMU 190 provides the first through fourth power mode control signals PCTR1~PCTR4 to the power domains 101~104 respectively and the power supply circuit 198 such that the power domains 101~104 operate in the first low power mode or in the second low power mode. When the mode signal MS indicates that an image signal to be displayed on the display unit 300 is a still image signal, the PMU 190 controls the power mode of the power domains 101~104 such that the power domains 101~104 operate in the first low power mode or in the second low power mode according to the characteristics of the still image and response characteristics required from the system.

The PMU 190 controls the power mode such that some of the powers supplied to the power domains 101~104 are gated and other of the powers supplied to the power domains 101~104 are cut-off.

When the memory resource of the internal frame buffer 140 is smaller than the memory request amount of the still image signal to be displayed, the PMU 190 may control the power mode such that that the power domains 101~104 operate in the second low power mode. In this case, the PMU 190 provides the power control signal PC3 to the power supply circuit 198 and the gating control signal PG3 to the top power domain 103 such that powers supplied to remaining domains 105, 110 and 180 except the second data path domain 106 in the top power domain 103 are cut-off. In addition, the PMU 190 provides the power control signals PC1, PC2 and PC4 to the power supply circuit 198 and respectively provides the gating control signals PG1, PG2 and PG4 to the power domains 101, 102 and 104 such that corresponding powers are respectively supplied to the power domains 101, 102 and 104.

When the memory resource of the internal frame buffer 140 is greater than the memory request amount of the still image signal to be displayed, the PMU 190 may control the power mode such that that the power domains 101~104 operate in the first low power mode. As mentioned above, the first low power mode includes the plurality of sub low power modes. In the first sub low power mode, the PMU 190 provides the power control signals PC1~PC4 to the power supply circuit 198 and respectively provides the gating control signals PG1~PG4 to the power domains 101~104 such that the power PWR3 supplied to the top power domain 103 is cut-off, the power PWR1 is supplied to the first power domain 101, the power PWR2 supplied to the second power domain 102 is gated, and the power PWR4 supplied to the external power domain 104 is gated.

In the second sub low power mode, the PMU 190 provides the power control signals PC1~PC4 to the power supply circuit 198 and respectively provides the gating control signals PG1~PG4 to the power domains 101~104 such that the power PWR3 supplied to the top power domain 103 is cut-off, the power PWR1 is supplied to the first power domain 101, the power PWR2 supplied to the second power domain 102 is gated, and the power PWR4 is supplied to the external power domain 104. In the third sub low power mode, the PMU 190 provides the power control signals PC1~PC4 to the power supply circuit 198 and respectively provides the gating control signals PG1~PG4 to the power domains 101~104 such that the power PWR3 supplied to the top power domain 103 is gated, the power PWR1 is supplied to the first power domain 101, the power PWR2 is supplied to the second power domain 102, and the power PWR4 is supplied to the external power domain 104.

Figure 3B:
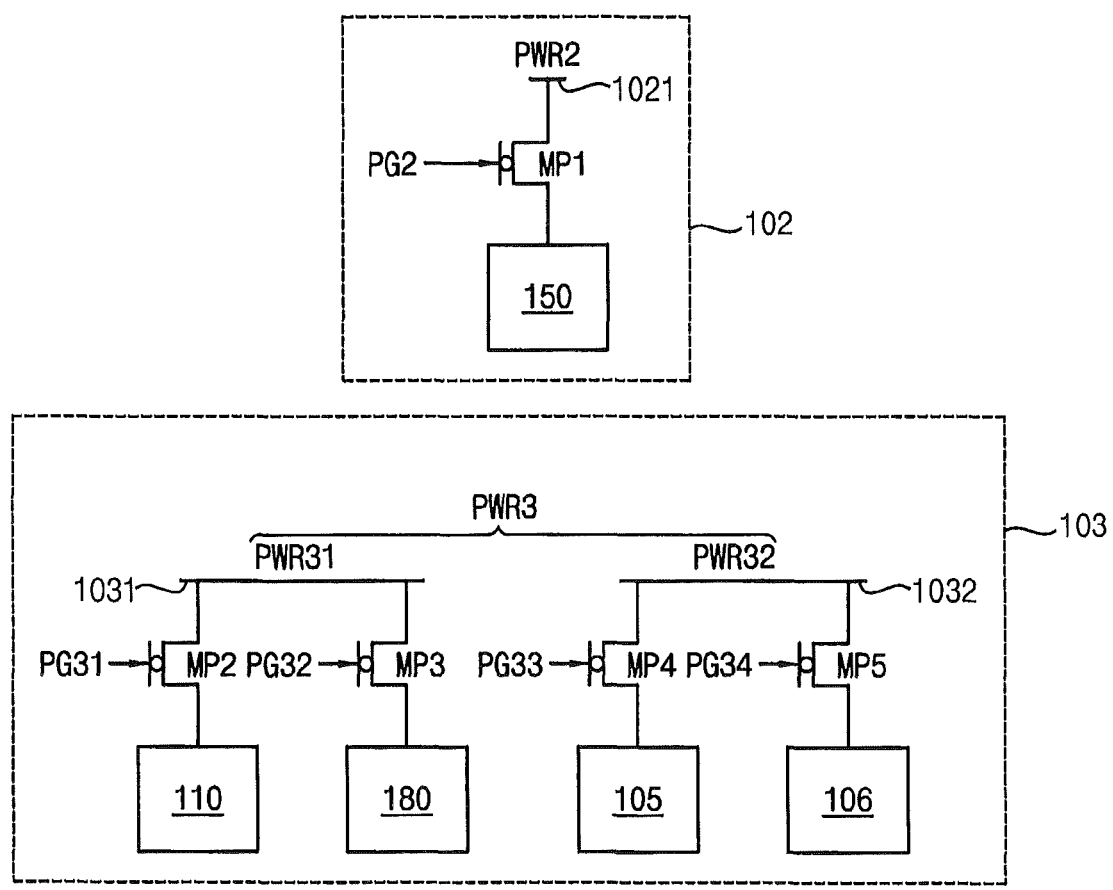
FIG. 3B illustrates the second power domain and the top power domain in FIG. 3A.

FIG. 3B illustrates the second power domain and the top power domain in FIG. 3A.

Referring to FIG. 3B, the second power domain 102 includes a power line 1021, a p-type metal-oxide semiconductor (PMOS) transistor MP1 and the memory control block 150. The second power PWR2 is applied to the power line 1021, and the PMOS transistor is connected between the power line 1021 and the memory control block 150. The PMOS transistor MP1 has a gate that receives the gating control signal PG2, and the PMOS transistor MP1 performs power gating on the second power PWR2 supplied to the memory control block in response to the gating control signal PG2.

The top power domain 103 includes the CPU core 110, the image processing block 103, a power line 1031 and PMOS transistors MP2 and MP3. A sub power PWR31 is applied to the power line 1031. The PMOS transistors MP2 and MP3 are connected between the sub power line 1031 and the CPU core 110 and the image processing block 180. The top power domain 103 further includes a first data path domain 105, a second data path domain 106, a power line 1032 and PMOS transistors MP4 and MP5. A sub power PWR32 is applied to the power line 1032. The PMOS transistors MP4 and MP5 are connected between the sub power line 1032 and the CPU core 110 and the first and second data path domains 105 and 106. The sub powers PWR31 and PWR32 are included in the third power PWR3. Each of gating control signals PG31~PG34 is applied to each gate of the PMOS transistors MP2~MP5. The PMU 190 provides the power control signals PC1~PC4 to the power supply circuit 198 and respectively provides the gating control signals PG1~PG4 to the power domains 101~104 such that corresponding power is supplied to the second data path domain 106 and the powers supplied to the remaining domains 110, 180 and 105 are cut-off in the second low power mode.

Figure 4:
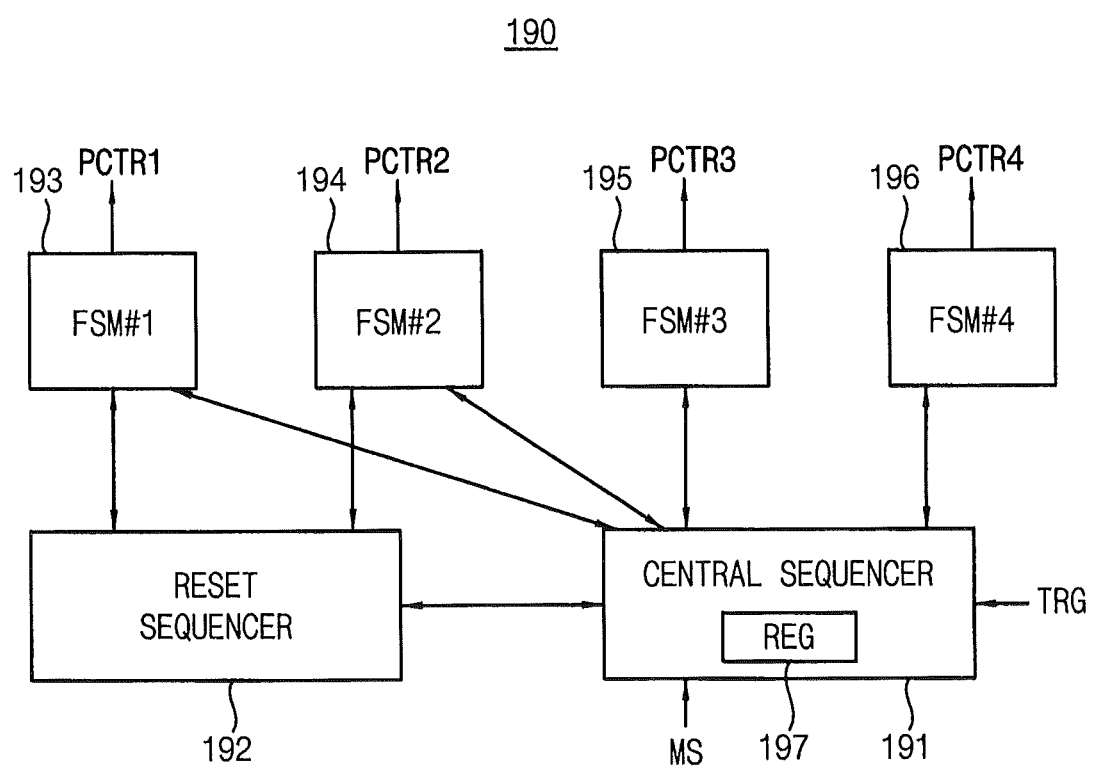
FIG. 4 is a block diagram illustrating the Power Management Unit in FIG. 2 according to some example embodiments.

FIG. 4 is a block diagram illustrating the PMU in FIG. 2 according to some example embodiments.

Referring to FIG. 4, the PMU 190 includes a plurality of finite state machines (FSMs) 193~196. Each of the plurality of finite state machines 193~196 may control each of the power domains 101~104 independently according to a control of the CPU core 110, e.g., the CPU core 110 embodied in the top power domain 103, especially according to configuration register values output from the CPU core 110. Each of the finite state machines 193~196 may provide each of the first through fourth power mode control signals PCTR1~PCTR4 to each of the power domains 101~104. As described above, each of the first through fourth power mode control signals PCTR1~PCTR4 may include each of power control signals PC1~PC4 for supplying or cutting-off each of the supply first through fourth powers PWR1~PWR4 and each of gating control signals PG1~PG4 for gating the first through fourth powers PWR1~PWR4.

Each of the plurality of finite state machines 193~196 may control each power state and/or each operation state of the plurality of power domains 101~104 independently according to configuration register values set in a configuration register included therein. The configuration register is an example of a storage which may store configuration register values including one-bit or more.

For example, the configuration register values include a plurality of bits, and some of the plurality of bits may be used as identification bits for identifying each of the plurality of finite state machines 193~196.

Here, a power state may include, for example, a power-up state (or a power-on state), a power-down state (or a power-off state), or a power-gating state. The power-up state means a state where a power or a voltage of a power domain to be controlled, e.g., a target power domain, is fully powered up. The power-down state means a state where a power of a target power domain is off. The power gating state means a state when a power of a power supplied to a target power domain is gated.

The operation state may be determined according to whether to supply a clock signal to each FC, whether to retain data stored in a data storage device embodied in each FC in each of the power domains 101~104, whether to use a bus of each FC, whether a pad embodied in each FC is isolated (disconnected) or connected, or whether an interface embodied in each FC is activated and on the like.

When the CPU core 110 includes a plurality of cores, each power state (e.g., whether to supply a power or not) and each operation state (e.g., whether to reset or not) may be controlled independently by a core.

For example, the CPU 110 may monitor each operation of a plurality of FC s included in each of the power domains 101~104 e.g., how much power each FC consumes, whether each FC performs a specific operation, or whether each FC is in an idle state, generate configuration register values indicating a power domain to be controlled, e.g., a target power domain, among the power domains 101~104 according to a monitoring result, and output generated configuration register values to the PMU 190.

A finite state machine controlling a power state of the target power domain may interpret the configuration register values output from the CPU core 110 and control a power state of the target power domain by power domain according to an interpretation result. In addition, the finite state machine may control each operation state of a plurality of FC s included in the target power domain according to the configuration register values.

According to some embodiments, the PMU 190 may further include a central sequencer 191 that determines an activation sequence (or order) of the plurality of finite state machines 193~196 or whether to activate the plurality of finite state machines 193~196 according to at least one central configuration register value set in a central configuration register 197 therein.

The central configuration register 197 may store the power control overhead index based on transition time from the low power mode to the normal mode and the amount of power consumption in each of the low power modes when the power domains 101~104 operate in one of the low power modes. The power control overhead index and the amount of power consumption may be determined while testing the mobile device 10 and the determined power control overhead index and the amount of power consumption are stored in the central configuration register 197.

The central sequencer 191 may be embodied in a finite state machine including a plurality of states. For example, a state may be embodied in a circuit, logic, code or a combination of these.

An activation sequence or whether to activate each of the plurality of states may be determined according to the at least a central configuration register value, and an activation sequence or whether to activate each of the plurality of finite state machines, e.g., 193~196, may be determined according to an activation sequence or whether to activate each of the plurality of states.

The central sequencer 191 does not determine each operation or an operation result of the plurality of finite state machines 193~196, but only determines an activation sequence or whether to activate each of the plurality of finite state machines 193~196. Accordingly, an activated finite state machine may not perform any action or work.

When the mode signal MS indicates that the image signal to be displayed on the display unit 300 is a moving image signal, the central sequencer 191 determines activation of the finite state machines 193~196, and thus the power domains 101~104 operate in the normal mode.

When the mode signal MS indicates that the image signal to be displayed on the display unit 300 is a still image signal, the central sequencer 191 determines whether to activate the state machines (for example, the state machines 193 and 192) to be activated in the low power mode, and thus the power domains 101~104 operate in one of the low power modes.

The central sequencer 191 may communicate with each of the finite state machines 193~196 by handshaking.

According to some example embodiments, the PMU 190 may further include a reset sequencer 192, which may control each reset operation of a plurality of finite state machines performing a reset function among the plurality of finite state machines 193~196 and 197 according to a reset event, e.g., a hardware reset, a software reset, a warm reset or a wakeup reset.

A reset sequencer 192 may be embodied in a finite state machine including a plurality of states. The reset sequencer 192 may control a reset operation of each finite state machine 193, 194 and 191.

FIG. 5 is a table illustrating operation modes of the application processor of FIG. 2.

Referring to FIGS. 2 through 5, the application processor 100 may operate in the normal mode and the low power mode including the first and second low power modes LPD1 and LPD2. As described above, when the image signal to be displayed on the display unit 300 is a moving image signal, the application processor 100 operates in the normal mode. In the normal mode, each of the powers PWR1~PWR4 is supplied to each of the power domains 101~104.

When the image signal to be displayed on the display unit 300 is a still image signal, the application processor 100 operates in a low power mode, such as one of the first and second low power modes LPD1 and LPD2. As described above, in the second low power mode LPD2, each of the powers PWR1, PWR2 and PWR4 is supplied to each of the first power domain 101, the second power domain 102 and the external power domain 104, and the power is supplied to the second data path domain 106 in the top power domain 103.

As described above, the first low power mode LPD1 may include the plurality of sub low power modes based on the power control overhead index and the characteristic of the still image. The first low power mode LPD1 includes the first through third sub low power modes. In FIG. 5, PG denotes that a power supplied to corresponding power domain is gated (i.e., turned off by means of a transistor switch), ON denotes that a power is supplied to corresponding power domain, and OFF denotes that a power supplied to corresponding power domain is cut-off. That is, OFF means that a regulator that supplies power to a power domain is turned-off. The regulator may be included in the power supply circuit 198 in FIG. 3A.

Still referring to FIG. 5, in the normal mode, power is supplied to the top power domain (TOP PD), the first power domain (Display PD), the second power domain (MEM_CON PD) and the external power domain (EXT_MEM PD). For each mode, the relative amount of power consumed in the mode is represented in the POWER column by an integer from 1 to 5, where a higher integer indicates more power consumption. Thus, for example, the most power is consumed when the device is in the NORMAL mode, and the least power is consumed when the device is in the MEM-GATING sub low power mode.

Furthermore, for each mode, a power control overhead index is listed in the column headed ON/OFF OT. The power control overhead index is indicated by an integer from 1 to 4, where a higher integer indicates a longer time to transition from one of the low power modes to another low power mode or to the normal mode. In some embodiments, the MEM-GATING sub low power mode may have the longest power control overhead index, while the MEM-AON mode (LPD2) may have the shortest power control overhead index among the low power modes.

Figure 6:
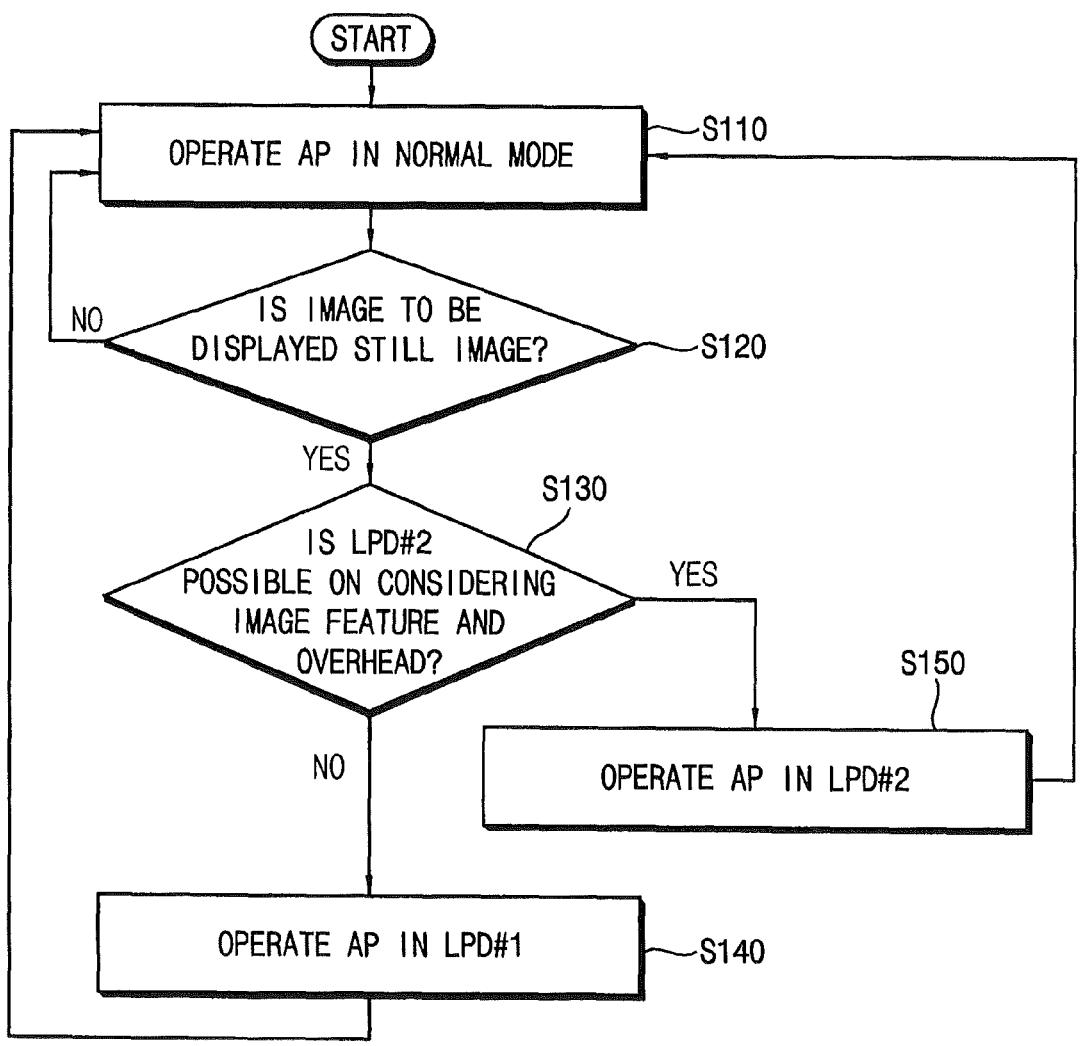
FIG. 6 is a flow chart illustrating methods of managing power of an application processor according to some example embodiments.

FIG. 6 is a flow chart illustrating methods of managing power of an application processor according to some example embodiments.

Referring to FIGS. 1 through 6, the application processor 100 is operated in the normal mode (S110). The CPU core 110 determines whether an image signal to be displayed on the display unit 300 is a still image signal or a moving image signal (S120). When the image signal to be displayed on the display unit 300 is a moving image signal (NO in S120), the application processor 100 is still operated in the normal mode (S110). When the image signal to be displayed on the display unit 300 is a still image signal (YES in S120), it is determined that whether the application processor 100 can operate in the second low power mode LPD2 based on the feature (relationship of the memory resource and the memory request amount) of the image signal and the power control overhead index stored in the central configuration register 197 (S130).

When the application processor 100 can not operate in the second low power mode LPD2 (NO in S130), the PMU 190 generates the power mode control signals PCTR1~PCTR4 such that the application processor 100 operates in the first low power mode LPD1 (S140). The application processor 100 operates in the first low power mode LPD1 and returns to the normal mode when predetermined condition is satisfied.

When the application processor 100 can operate in the second low power mode LPD2 (YES in S130), the PMU 190 generates the power mode control signals PCTR1~PCTR4 such that the application processor 100 operates in the second low power mode LPD2 (S150). The application processor 100 operates in the second low power mode LPD2 and returns to the normal mode when predetermined condition is satisfied.

Figure 7:
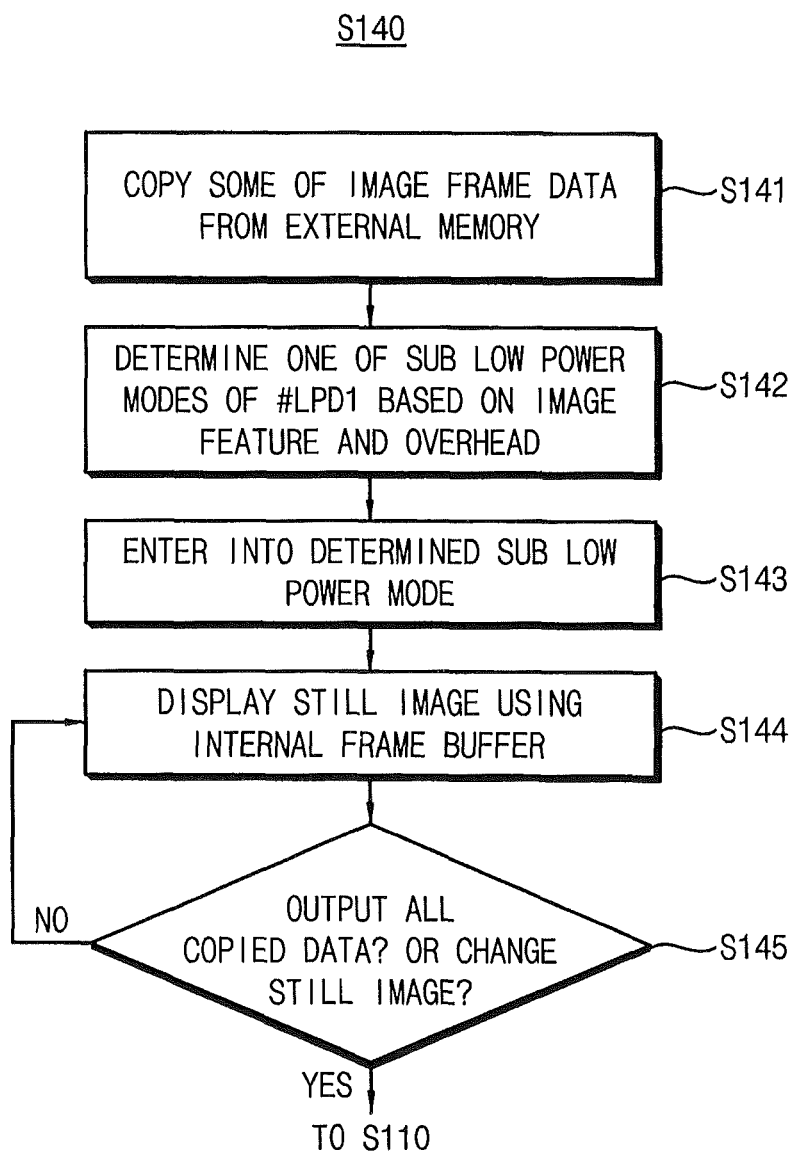
FIG. 7 is a flow chart illustrating that the application processor operates in the first low power mode in FIG. 6.

FIG. 7 is a flow chart illustrating operation of the application processor 100 in the first low power mode.

Referring to FIGS. 1 through 7, when the application processor 100 is determined to operate in the first low power mode LPD1, some portion of the still image signal stored in the external memory 50 is copied to the internal frame buffer 140 (S141). One of a plurality of sub low power modes of the first low power mode LPD1 is determined considering the feature of the still image signal and the power control overhead index (S142), the application processor 100 enters into the determined sub low power mode and operates in the determined sub low power mode (S143). The still image signal is displayed on the display unit 300 using the some portion of the still image signal copied to the internal frame buffer 140 (S144). In this case, the PMU 190 controls the power mode such that the power PWR1 is supplied to the first power domain 101 including the display block 120 and the powers PWR2~PWR4 are gated or cut-off to the power domains 102~104 according to the response characteristic required by the mobile device 10.

It is then determined whether some portion of the still image signal copied to the internal frame buffer 140 is all transmitted to the display unit 300 or the still image signal is to be updated (S145). The operations return to the step (S144) when NO is determined in the step (S145), and the application processor 100 enters into the normal mode when YES is determined in the step (S145).

Figure 8:
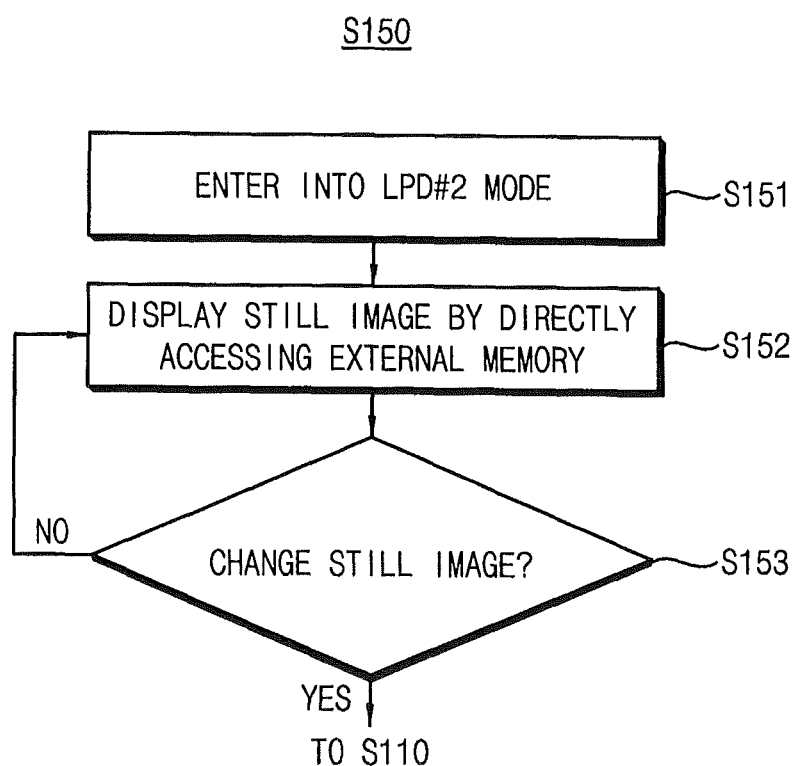
FIG. 8 is a flow chart illustrating that the application processor operates in the second low power mode in FIG. 6.

FIG. 8 is a flow chart illustrating operation of the application processor in the second low power mode in FIG. 6.

Referring to FIGS. 1 through 6 and 8, when the application processor 100 is determined to operate in the second low power mode LPD2, the application processor 100 enters into the second low power mode LPD2 (S151). The still image signal is displayed on the display unit 300 by directly accessing the still image signal from the external memory 50 (S152). It is then determined that whether the still image signal is to be updated (changed) (S153). When the still image signal is not to be updated (NO in S153), procedure returns to the step (S152). When the still image signal is to be updated (YES in S153), the application processor 100 enters into the normal mode.

When the application processor 100 operates in the second low power mode LPD2, the PMU 190 controls the power mode of the power domains 101~104 such that each of the powers PWR1, PWR2 and PWR4 is supplied to each of the first power domain 101, the second power domain 102 and the external power domain 104, and the power is supplied to the second data path domain 106 in the top power domain 103 as described with reference to FIG. 5.

Figure 9:
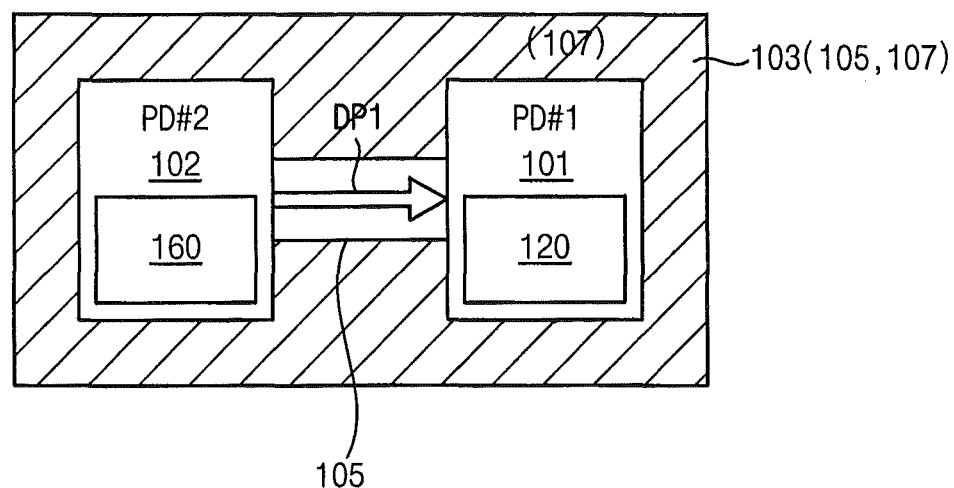
FIG. 9 illustrates the power domains in the application processor in FIG. 3 in the first low power mode.

FIG. 9 illustrates the power domains in the application processor in FIG. 3 in the first low power mode.

Referring to FIG. 9, there are illustrated the first power domain 101 including the display block 120, the second power domain 102 including the memory controller 160 and the top power domain 103. The top power domain 103 includes the first data path domain 105 and the remaining domain 107. The first data path domain 105 is a domain through which a first data path DP1 passes, and the first data path DP1 is a path through which the some portion of the still image is copied to the internal frame buffer 140 in the first low power mode. The remaining domain 107 is a domain through which the first data path DP1 does not pass. While the portion of the still image signal stored in the external memory 50 is copied to the internal frame buffer 140, the PMU 190 controls the power mode of the power domains 101~104 such that powers are supplied to the first power domain 101, the second power domain 102 and the first data path domain 105 and the power is cut off from the remaining domain 107. In addition, when copying the portion of the still image signal to the internal frame buffer 140 is completed, the PMU 190 controls the power mode of the power domains 101~104 such that the power is supplied to the first power domain 101 and the powers are cut-off from the second power domain 102, the first data path domain 105 and the remaining domain 107. When the portion of the still image signal copied is consumed to a predetermined reference amount, the PMU 190 controls the power mode of the power domains 101~104 such that powers are supplied to the first power domain 101, the second power domain 102 and the first data path domain 105 and the power is cut off from the remaining domain 107 in response to the trigger signal TRG. Repeating these operation, the application processor 100 reduces power consumption in the first low power mode.

Figure 10:
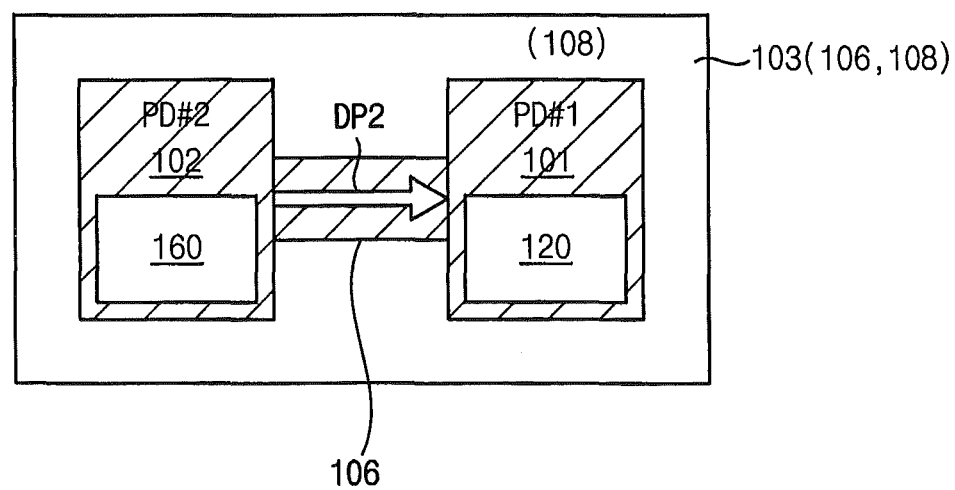
FIG. 10 illustrates the power domains in the application processor in FIG. 3 in the second low power mode.

FIG. 10 illustrates the power domains in the application processor in FIG. 3 in the second low power mode.

Referring to FIG. 10, there are illustrated the first power domain 101 including the display block 120, the second power domain 102 including the memory controller 160 and the top power domain 103. The top power domain 103 includes the second data path domain 106 and the remaining domain 108. The second data path domain 106 is a domain through which a second data path DP2 passes, and the second data path DP2 is a path through which the still image is transmitted from the memory controller 160 to the display controller 130 in the display block 120 in the second low power mode. The remaining domain 108 is a domain through which the second data path DP2 does not pass. In FIG. 10, the still image signal stored in the external memory 50 is transmitted to the display unit 300 without using the internal frame buffer 140 when the application processor 100 operates in the second low power mode. Since the still image signal stored in the external memory 50 is transmitted to the display unit 300 without using the internal frame buffer 140, the PMU 190 controls the power mode of the power domains 101~104 such that powers are supplied to the first power domain 101, the second power domain 102 and the second data path domain 106 and the power is cut off from the remaining domain 108.

Figure 11:
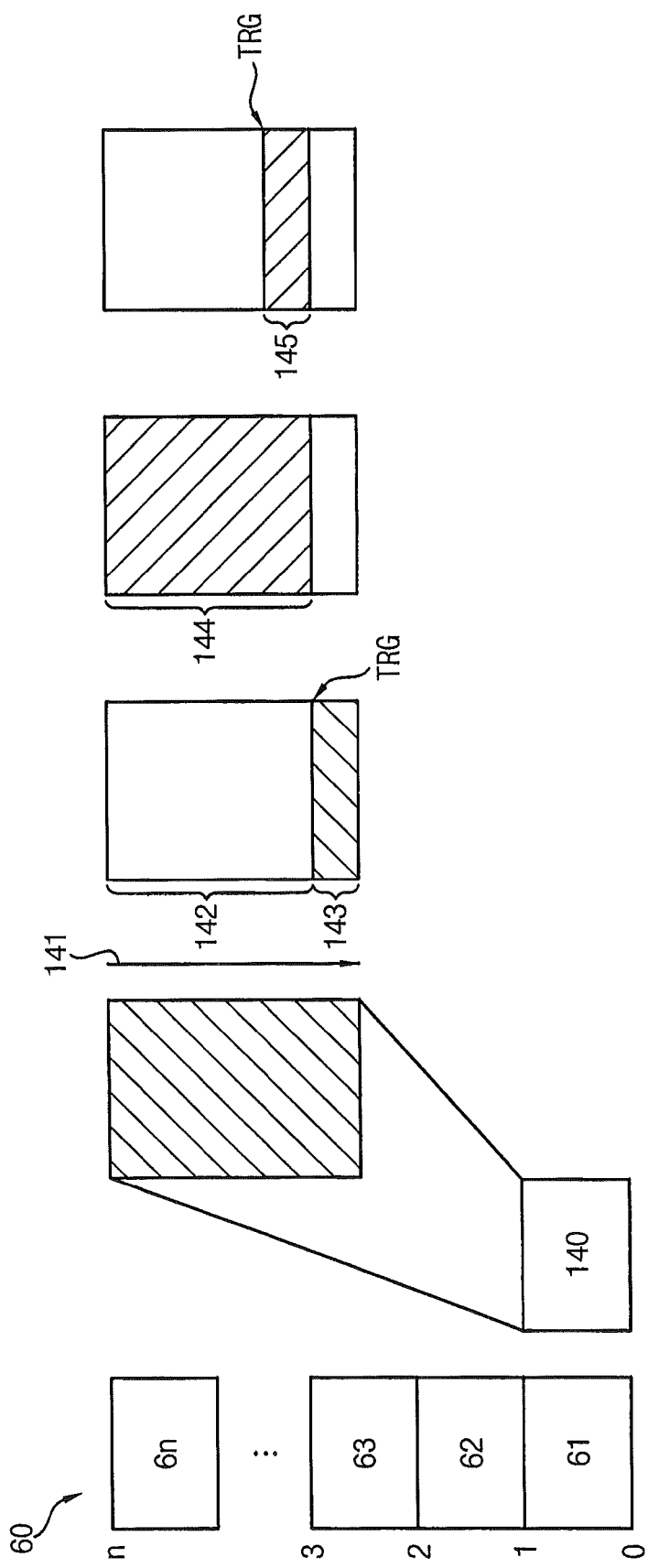
FIG. 11 illustrates the external memory and the internal frame buffer in the first low power mode.

FIG. 11 illustrates operation of the external memory and the internal frame buffer in the first low power mode according to some embodiments.

Referring to FIG. 11, it is assumed that total image signal 60 stored in the external memory 50 includes a plurality of sub frames 61~6n. That is, the memory resource of the internal frame buffer 140 is greater than the memory request amount of the image signal 60. Each data size of the sub frames 61~6n may be substantially same as a capacity of the internal frame buffer 140.

In the first low power mode (LPD1), after some portion of an image signal corresponding to the sub frame 61 is copied to the internal frame buffer 140, the portion of the image signal corresponding to the sub frame 61 is sequentially transmitted to the display unit and is consumed by the display controller 130 (FIG. 2) according to a direction indicated by an arrow 141. When the portion of the image signal corresponding to the sub frame 61 is consumed by an amount 142 with a predetermined reference amount 143 remaining, the display controller 130 activates the trigger signal TRG and provides the activated trigger signal TRG to the PMU 190. The PMU 190 generates the power mode control signals PCTR1~PCTR4 such that corresponding powers are supplied to the power domains associated with copying the portion of the image signal to the internal frame buffer 140, in response to the activated trigger signal TRG. After the portion 144 of the image signal is copied to the internal frame buffer 140, the PMU 190 controls the power mode such that the power is supplied to the first power domain 101 including the display block 120. When the portion of the image signal is consumed to an amount 145, the display controller 130 activates the trigger signal TRG and provides the activated trigger signal TRG to the PMU 190. The PMU 190 generates the power mode control signals PCTR1~PCTR4 such that corresponding powers are supplied to the power domains associated with copying the portion of the image signal to the internal frame buffer 140, in response to the activated trigger signal TRG.

Figure 12:
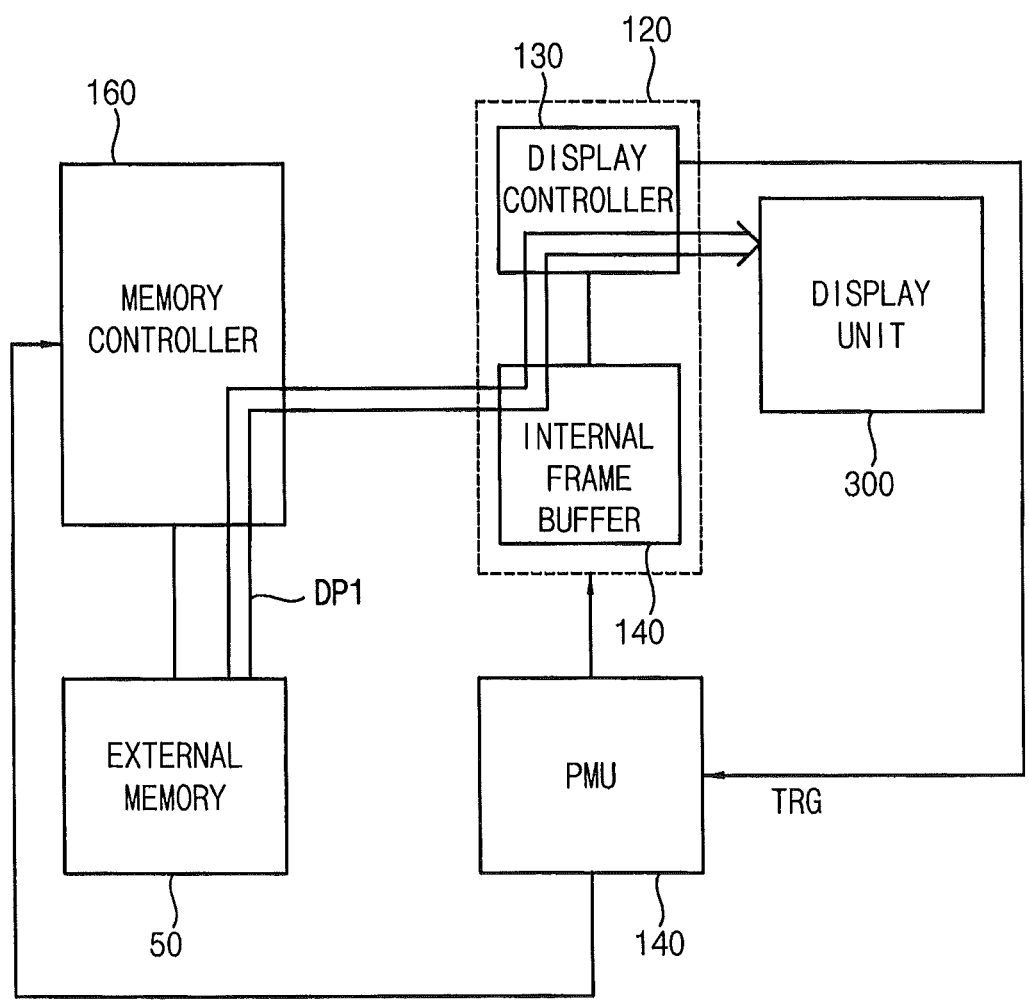
FIG. 12 illustrates the first data path of the image signal in the first low power mode.

FIG. 12 illustrates the first data path of the image signal in the first low power mode.

Referring to FIG. 12, in the first low power mode, the still image signal stored in the external memory 50 is transmitted to the display unit 300 via the first data path DP1 including the memory controller 160, the internal frame buffer 140 and the display controller 130. As described above, when the portion of the still image signal copied to the internal frame buffer is consumed to the predetermined reference amount, the display controller 130 activates the trigger signal TRG to the PMU 190. The PMU may supply the power to the power domain including the memory controller 150 in response to the activated trigger signal TRG.

Figure 13:
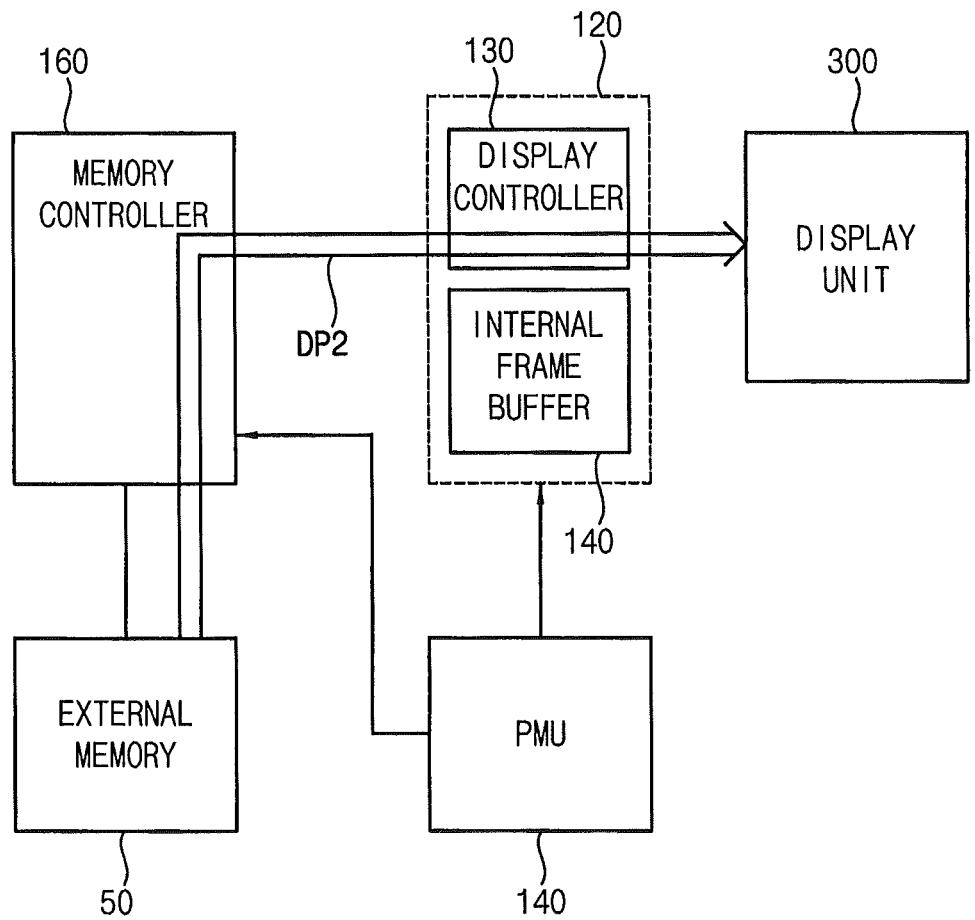
FIG. 13 illustrates the second data path of the image signal in the second low power mode.

FIG. 13 illustrates the second data path of the image signal in the second low power mode.

Referring to FIG. 13, in the second low power mode, the still image signal stored in the external memory 50 is transmitted to the display unit 300 via the second data path DP2 including the memory controller 160 and the display controller 130. That is, in the second low power mode, the still image signal stored in the external memory 50 is transmitted to the display unit 300 without using the internal frame buffer 140.

Figure 14:
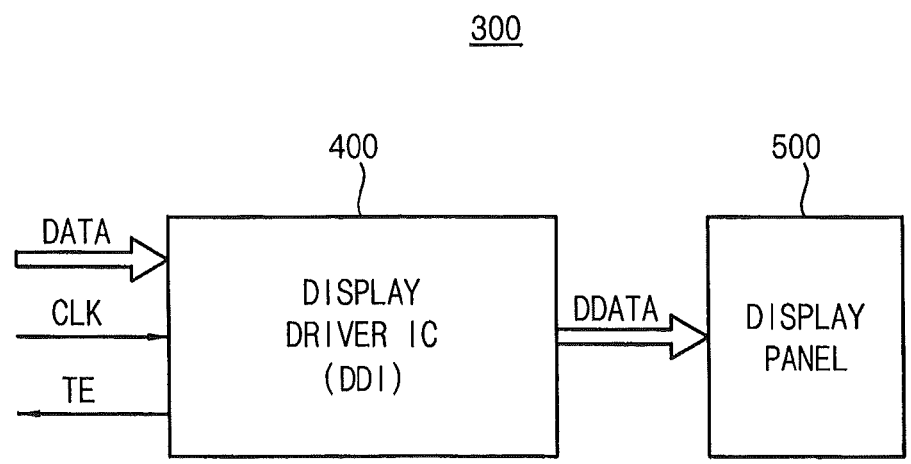
FIG. 14 is a block diagram illustrating the display unit in FIG. 1 according to some example embodiments.

FIG. 14 is a block diagram illustrating the display unit in FIG. 1 according to some example embodiments.

Referring to FIG. 14, the display unit 300 includes a display driver (i.e., a display driver integrated circuit (IC)) 400 and a display panel 500.

The display driver 400 may select one of a first interface that processes a still image signal and a second interface that processes a moving image signal, process the image signal DATA and output the processed image signal as an output image signal DDATA to the display panel 500 through the selected interface in response to a mode change command output from the application processor 100. The first and second interfaces may be implemented in the display driver 400. For example, the display 500 may be a liquid crystal display (LCD), a light emitting diode (LED) display, an organic LED (OLED) display or an active-matrix OLED (AMOLED) display, etc.

Figure 15:
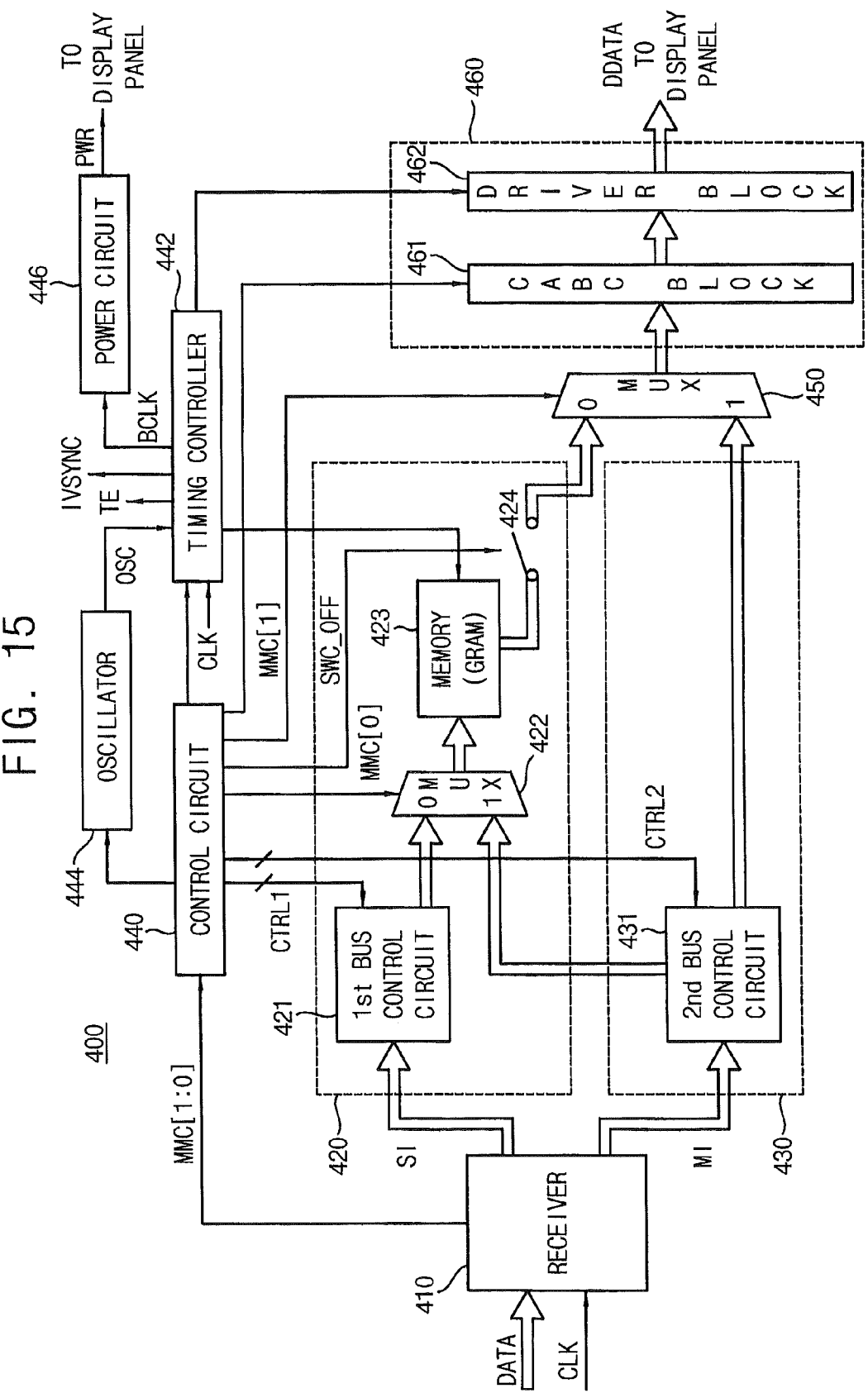
FIG. 15 is a block diagram illustrating the display driver in FIG. 14 according to some example embodiments.

FIG. 15 is a block diagram illustrating the display driver in FIG. 14 according to some example embodiments.

The display driver 400 may perform one of the four operation modes according to the mode change command MCC [1:0] output from the application processor 100 and included in the image signal DATA.

Referring to FIG. 15, the display driver 400 includes a receiver 410, a first interface 420, a second interface 430, a control circuit 440, a first selection circuit 450, an output circuit 460 and a timing controller 442. The display driver 400 may also include an oscillator 444 and a power circuit 446.

The receiver 410 receives the image signal DATA including the mode change command MCC which indicates whether the image signal DATA to be displayed on the display panel 500 includes the still image signal SI or the moving image signal MI. The image signal DATA is transmitted in synchronization with the clock signal CLK.

The receiver 410 transmits the mode change command MCC included in the image signal DATA to the control circuit 440.

The receiver 410 converts the format of the image signal DATA corresponding to the command mode, i.e., the still image signal SI received in series, into a format that can be processed by the first interface 420 and outputs the still image signal SI with the converted format to the first interface 420. The receiver 410 also converts the format of the image signal DATA corresponding to the video mode, i.e., the moving image signal MI received in series, into a format that can be processed by the second interface 430 and outputs the moving image signal MI with the converted format to the second interface 430.

The control circuit 440 generates first control signals CTRL1 and second control signals CTRL2 in response to the mode change command MCC received from the receiver 410 and transmits the first control signals CTRL1 to the first interface 420 and the second control signals CTRL2 to the second interface 430. The control circuit 440 generates first interface control signals CTRL1, MMC [0], and SWC_OFF for controlling the first interface 420 in response to the mode change command MCC received from the receiver 410.

For example, the first interface 420 may be an interface supporting Mobile Industry Processor Interface (MIPI®) command mode using memory to process still image signals, a CPU interface, or a micro controller unit (MCU) interface, etc. The second interface 430 may be an interface supporting MIPI® video mode processing moving image signals without using memory or an RGB interface.

In response to the first control signals CTRL1, the first interface 420 outputs the still image signal SI received from the receiver 410 using the memory 423. The first interface 420 includes a first switching circuit 421, a second selection circuit 422, the memory 423, and a scan switching circuit 424.

The first switching circuit 421 controls the transmission of the still image signal SI to the second selection circuit 422 in response to the first control signals CTRL1. The first switching circuit 421 functions as a logic circuit controlling a bus through which still image signals are transmitted. In response to the second selection signal MMC[0], the second selection circuit 422 selectively transmits either the still image signal SI received from the first switching circuit 421 or the moving image signal MI received from the second switching circuit 431 of the second interface 430 to the memory 423. For instance, the second selection circuit 422 transmits the still image signal SI received from the first switching circuit 421 to the memory 423 when the second selection signal MMC [0] is logic 0 or low level and transmits the moving image signal MI received from the second switching circuit 431 to the memory 423 when the second selection signal MMC [0] is logic 1 or high level.

The memory 423 may be implemented by a graphic memory and stores an image signal transmitted from the second selection circuit 422. Access operations, e.g., a write operation and a read operation, on the memory 423 are controlled by the timing controller 442. The still image signal SI or the moving image signal MI stored in the memory 423 according to the mode is transmitted to the display panel 500 through the scan switching circuit 424, the first selection circuit 450, and the output circuit 460. The scan switching circuit 424 transmits the still image signal SI or the moving image signal MI stored in the memory 421 to the first selection circuit 450 in response to the scan switching signal SWC_OFF received from the control circuit 440.

The second switching circuit 431 of the second interface 430 outputs the moving image signal MI received from the receiver 410 to at least one of the first selection circuit 450 and the second selection circuit 422 of the first interface 420 in response to the second control signals CTRL2. The second switching circuit 431 functions as a logic circuit controlling a bus through which moving image signals are transmitted.

The control circuit 450 generates the first selection signal MMC[1], the scan switching signal SWC_OFF, and a second selection signal MMC[0] in response to the mode change command MCC[1:0] received from the receiver 410.

The first selection circuit 450 selectively transmits either the still image signal SI output from an output port, i.e., the scan switching circuit 424, of the first interface 420 or the moving image signal MI output from an output port of the second interface 430 to the output circuit 460 in response to the first selection signal MMC[1]. Each of the selection circuits 450 and 460 may be implemented by a multiplexer. For instance, the first selection circuit 450 transmits an image signal received from the first interface 420 to the output circuit 460 when the first selection signal MMC[1] is logic 0 and transmits an image signal received from the second interface 430 to the output circuit 460 when the first selection signal MMC[1] is logic 1.

The output circuit 460 processes an image signal, e.g., the still image signal SI or the moving image signal MI, transmitted from the first selection circuit 450 and transmits a processed image signal DDATA to the display panel 500.

The output circuit 460 may include a brightness control circuit such as a content adaptive brightness control (CABC) block 461 and a driver block 462. The brightness control circuit 461 eliminates distortion from the image signal by adjusting the brightness of a back light unit and a gamma curve according to the image signal to be displayed on the display panel 500 using an algorithm. The operation of the brightness control circuit 461 may be controlled by a control signal output from the control circuit 440. The driver block 462 transmits an image signal output from the brightness control circuit 461 to the display panel 500. The driver block 462 includes a plurality of source drivers (not shown) which may provide a grayscale voltage to a plurality of data lines (or source lines), respectively, according to the image signal. According to example embodiments, the driver block 462 may include at least one gate driver or a scan driver (not shown). The driver block 462 is controlled by a control signal output from the timing controller 442.

The timing controller 442 controls the operation of the driver block 462 in response to a control signal from the control circuit 440. The timing controller 442 also generates the TE control signal TE in response to the control signal from the control circuit 440 to mitigate (or alternatively, prevent) tearing or screen tearing and transmits the TE control signal TE to the application processor 100.

The CPU core 110 of the application processor 100 may monitor the TE control signal TE and control the transmission timing of the still image signal SI or the moving image signal MI according to a monitoring result in order to mitigate (or alternatively, prevent) tearing or screen tearing.

The timing controller 442 also generates a power reference clock signal BCLK in response to the clock signal CLK or an oscillation signal OSC. For instance, the power circuit 446 boosts the power of the display driver 400 according to the power reference clock signal BCLK and outputs a boosted power BPWR.

The timing controller 442 may also generate an internal vertical synchronization signal IVSINC related to the transmission of moving image signals. The pulse width of the internal vertical synchronization signal IVSYNC may be less than that of the TE control signal TE.

The oscillator 444 generates the oscillation signal OSC according to the control of the control circuit 440 and transmits the oscillation signal OSC to the timing controller 442.

Figure 16:
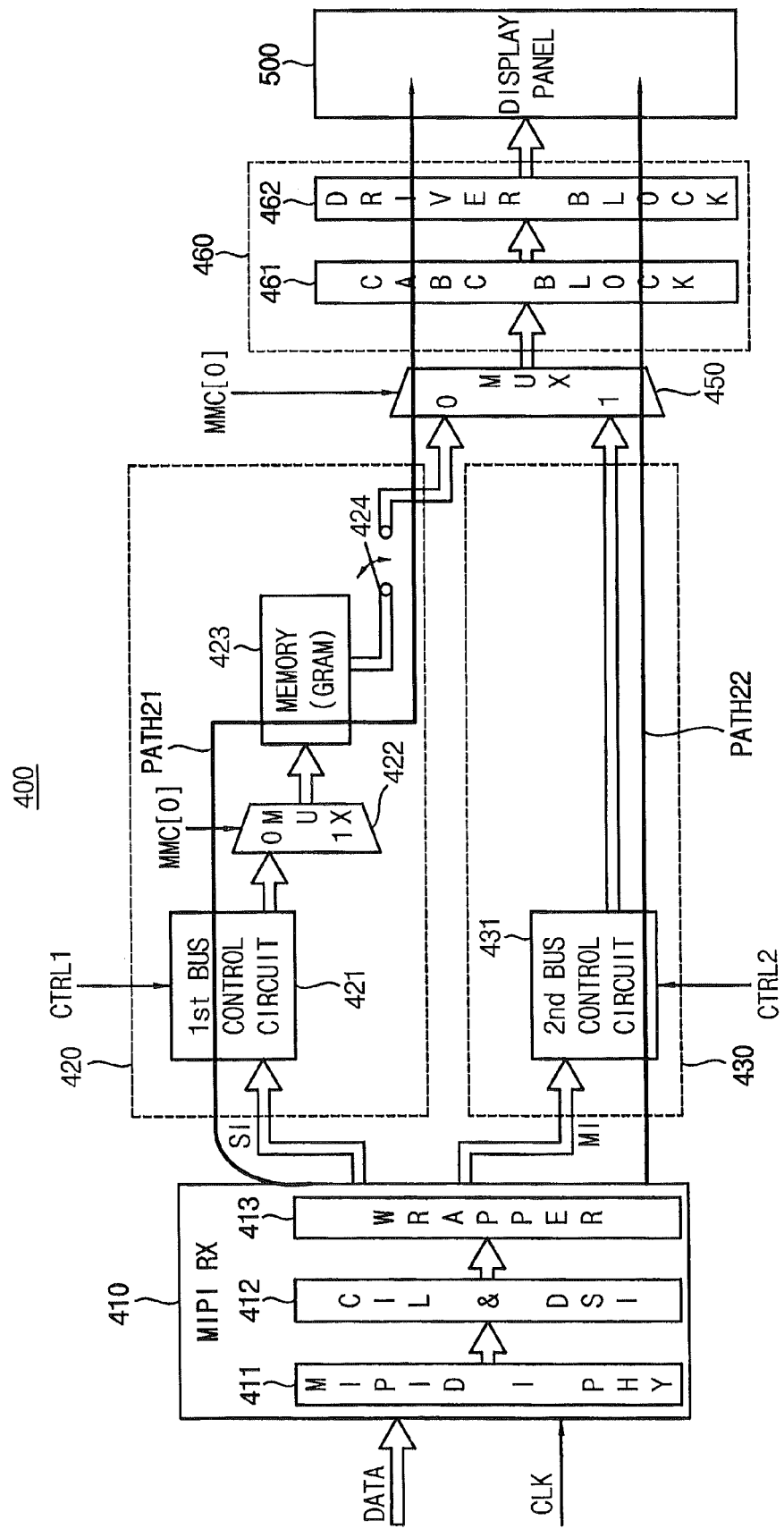
FIG. 16 is a diagram showing image signal paths according to operation modes of the display driver in FIG. 15.

FIG. 16 is a diagram showing image signal paths according to operation modes of the display driver in FIG. 15.

Figure 17:
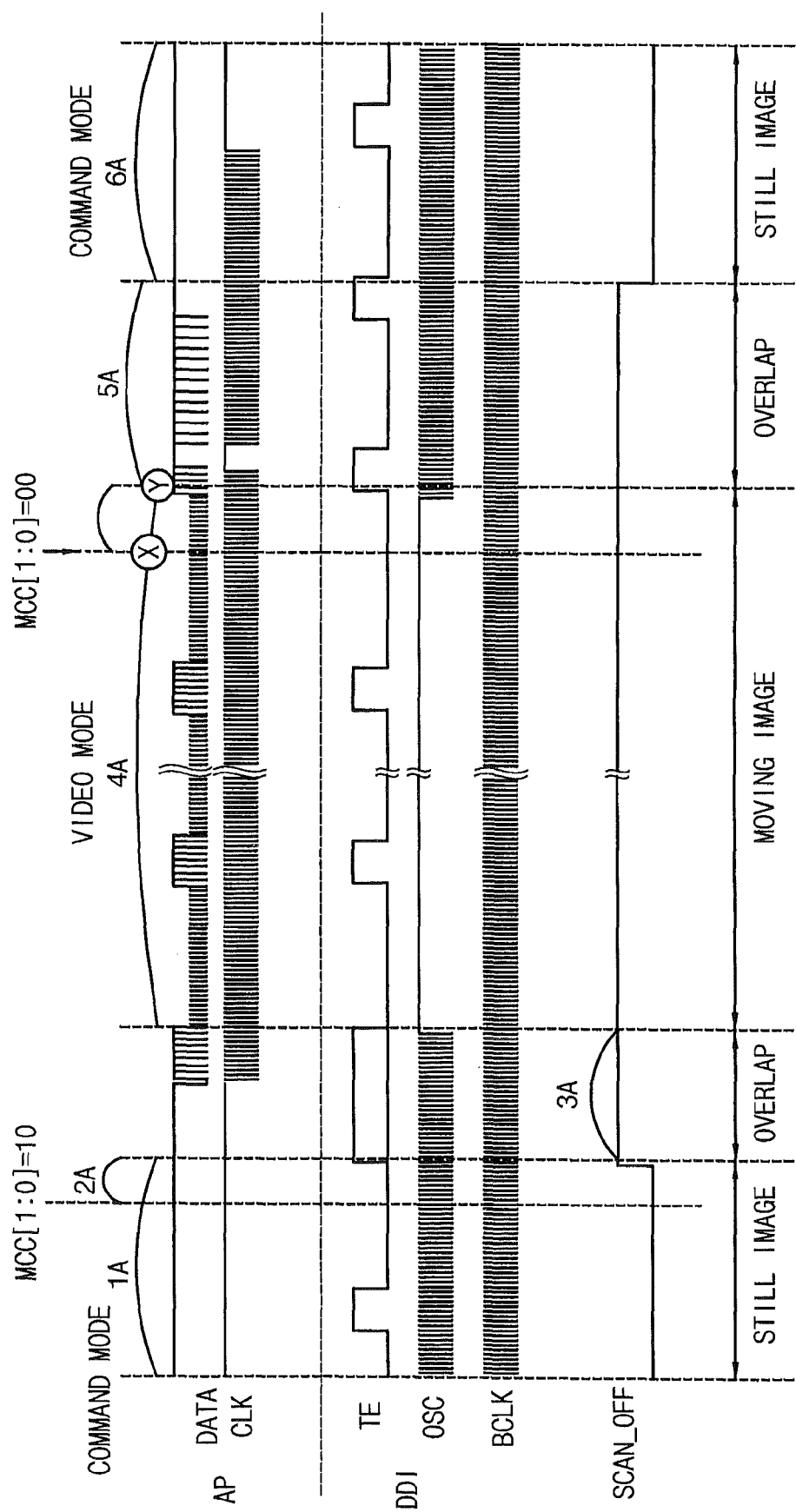
FIG. 17 is a timing diagram illustrating the signals of the display driver in FIG. 15.

FIG. 17 is a timing diagram illustrating the signals of the display driver in FIG. 15.

A procedure for sequentially displaying a still image signal, a moving image signal, and another still image signal on the display panel 500 will be described with reference to FIGS. 15 through 17 below.

When the application processor 100 intends to transmit a still image signal SI to the display driver 400, the CPU core 110 detects non-operation of the codec 120 and transmits the mode change command MCC[1:0] (=00) according to a detection result to the display driver 400. The receiver 410 transmits the mode change command MCC[1:0] (~00) to the control circuit 440. In response to the mode change command MCC[1:0] (=00) transmitted from the receiver 410, the control circuit 440 generates the first control signals CTRL1 for enabling the first switching circuit 421 of the first interface 420, the second control signals CTRL2 for disabling the second switching circuit 431 of the second interface 430, the second selection signal MMC[0] (=0) for transmitting an output signal of the first switching circuit 421 to the memory 423, the scan switching signal SWC_OFF for transmitting an output signal of the memory 423 to the first selection circuit 450, and the first selection signal MMC[1] (=0) for transmitting an output signal of the first interface 420 to the output circuit 460. In other words, the first interface 420 is selected, so that a first path PATH21 is formed.

After outputting the mode change command MCC[1:0] (~00), the application processor 100 outputs the still image signal SI. The still image signal SI (included in the image signal DATA) output from the application processor 100 is transmitted to the display panel 500 through the first interface 420 or the first path PATH21 and is displayed on the display panel 500.

During a command mode, i.e., a period 1A (FIG. 17) defined by the mode change command MCC[1:0] (=00), the still image signal SI is displayed on the display panel 500.

In a case where the application processor 100 intends to transmit a moving image signal MI to the display driver 400, the codec 180 is operated. The CPU core 110 generates the mode change command MCC[1:0] (=10) according to the operation of the codec 180 and the interface 122 transmits an image signal DATA including the mode change command MCC[1:0] (=10) to the display driver 400.

In response to the mode change command MCC[1:0] (=10) transmitted from the receiver 410, the control circuit 440 generates the first control signals CTRL1 for disabling the first switching circuit 421 of the first interface 420, the second control signals CTRL2 for enabling the second switching circuit 431 of the second interface 430, the scan switching signal SWC_OFF for transmitting an output signal of the memory 423 to the first selection circuit 450 during a period 2A, and the first selection signal MMC[1] (=1) for transmitting an output signal of the second interface 430 to the output circuit 460. In other words, the second interface 460 is selected so that a second path PATH22 is formed.

The scan switching circuit 424 is turned on when the scan switching signal SWC_OFF is at a first level, e.g., a low level, and is turned off when the scan switching signal SWC_OFF is at a second level, e.g., a high level.

A period 3A is a ready period or an overlap interval OVERLAP for switching from the command mode COMMON MODE to the video mode VIDEO MODE. During the period 3A, the output circuit 460 is disabled according to the control of the timing controller 442. Accordingly, the display panel 500 holds a frame of a still image displayed right before the output circuit 460 is disabled.

Throughout the periods 1A and 3A, the oscillator 444 generates the oscillation signal OSC according to the control of the control circuit 2208. The oscillation signal OSC may be the frequency of the frame displayed on the display panel 500. For instance, when the display panel 500 is implemented by a thin-film transistor (TFT) LCD, a voltage provided to the TFT-LCD is maintained at the polarity of a previous frame in order to mitigate (or alternatively, prevent) flicker from occurring in the TFT-LCD.

After the period 3A elapses, the display driver 400 is switched from the command mode COMMAND MODE to the video mode VIDEO MODE. In other words, during a period 4A, the application processor 100 transmits the moving image signal MI (included in the image signal DATA) to the display driver 400. The display driver 400 transmits the moving image signal MI received from the application processor 100 to the display panel 500 using the second interface 430 or the second path PATH22. The display panel 500 displays the moving image signal MI using a dot clock signal. During period 4A, the oscillator 444 does not generate the oscillation signal OSC according to the control of the control circuit 440.

In example embodiments where the application processor 100 subsequently transmits a still image signal SI after the moving image signal MI to the display panel 500, the CPU core 110 detects the termination of the operation of the codec 180 and generates and transmits the mode change command MCC[1:0] (=00) to the register 121 according to a detection result. The interface 122 transmits the image signal DATA including the mode change command MCC[1:0] (=00) to the display driver 400.

The mode change command MCC[1:0] (=00) may be embedded in the image signal DATA at a time point X or may be embedded in the vertical synchronization signal (or a vertical blanking interval) at a time point Y when it is transmitted to the display driver 400. In response to the mode change command MCC[1:0] (=00) transmitted from the receiver 410, the control circuit 440 generates the first control signals CTRL1 for enabling the first switching circuit 421 of the first interface 420, the second control signals CTRL2 for disabling the second switching circuit 431 of the second interface 430, the second selection signal MMC[0] (=0) for transmitting an output signal of the first switching circuit 421 to the memory 423, the scan switching signal SWC_OFF for transmitting an output signal of the memory 423 to the first selection circuit 450, and the first selection signal MMC[1] (=0) for transmitting an output signal of the first interface 420 to the output circuit 460. In other words, the operation mode of the display driver 400 is switched from the video mode VIDEO MODE to the command mode COMMAND MODE. The first interface 420 is selected, so that the first path PATH21 is formed.

Although the operation mode of the display driver 400 is switched from the video mode VIDEO MODE to the command mode COMMAND MODE, time for writing the still image signal SI received in the command mode COMMAND MODE to the memory 423 is needed since the memory 423 is not accessed in the video mode VIDEO MODE. Accordingly, during a period 5A, i.e., an overlap interval OVERLAP in FIG. 17, the driver block 462 of the output circuit 460 is disabled according to the control of the timing controller 442. As a result, the display panel 500 holds a moving image frame displayed right before the output circuit 460 is disabled. During the period 5A, the still image signal SI transmitted through the first switching circuit 421 is written to the memory 423. In addition, during the period 5A, the scan switching signal SWC_OFF is at the high level, and therefore, the still image signal SI written to the memory 423 is not output.

During a period 6A after the operation mode is switched from the video mode VIDEO MODE to the command mode COMMAND MODE, the still image signal SI written to the memory 423 is transmitted from the memory 423 to the display panel 500 through the first path PATH21. In other words, the display driver 400 scans the still image signal SI written to the memory 423 and outputs the scanned still image signal SI to the display panel 500 such that the still image signal SI is displayed on the display panel 400.

Figure 18:
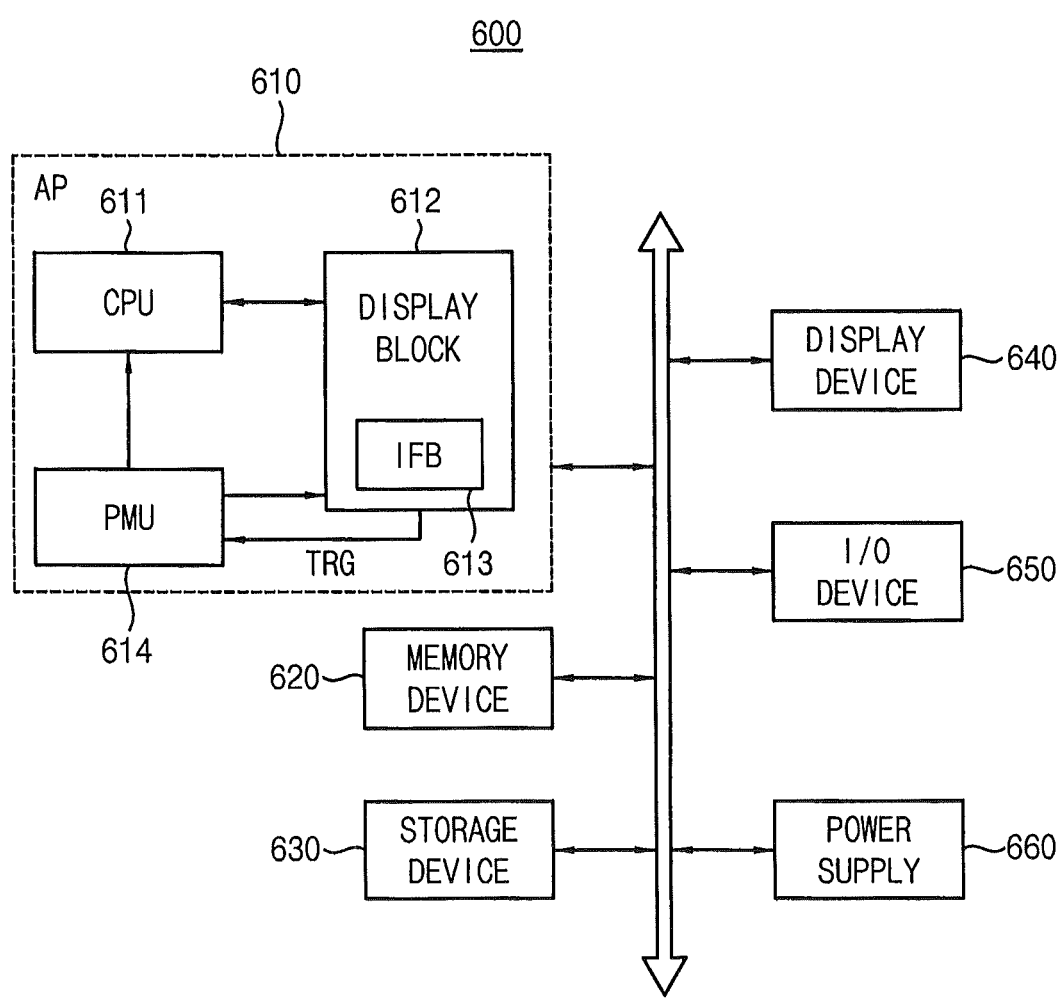
FIG. 18 is a block diagram illustrating an electronic device including the application processor according to some example embodiments.

FIG. 18 is a block diagram illustrating an electronic device including the application processor according to some example embodiments.

Referring to FIG. 18, an electronic device 600 includes an application processor 610 and a display device 640. The electronic device 600 may further include a memory device 620, a storage device 630, an input/output (I/O) device 650 and a power supply 660.

The application processor 610 may be implemented in the form of one chip in which a CPU core 611, a display block 612 including an internal frame buffer 613 and a PMU 614 are integrated. The application processor 610 may be identical to the application processor 100 of FIG. 2.

The application processor 610, as described above, operates in the normal mode when an image signal to be displayed on the display device 640 is a moving image signal and operates in one of the first and second low power modes based on a feature of a still image signal and a power control overhead index when an image signal to be displayed on the display device 640 is a still image signal, thereby to reduce power consumption. The PMU 614 controls a power mode of power domains of the application processor 610 such that the power domains operate in one of the low power modes having different power depths with respect to each other when the an image signal to be displayed on the display device 640 is a still image signal. The power control overhead index may be based on time required for the application processor 610 to transition from each of a plurality of low power modes to the normal mode. When the application processor 610 operates in the first low power mode, portion of the image signal stored in the memory device 620 is copied to the internal frame buffer 613. When the portion of the image signal copied to the internal frame buffer 613 is consumed to a predetermined reference amount, a display controller in the display block 612 activates a trigger signal TRG to the PMU 614. The PMU 614 controls the power mode of the application processor 610 such that corresponding powers are supplied to the power domains associated with copying the portion of the image signal to the internal frame buffer 613 and the powers are gated or cut-off to the power domain not associated with the copying operation, in response to the activated trigger signal TRG. When the application processor 610 operates in the second low power mode, the image signal stored in the memory device 620 is transmitted to the display device 640 without using the internal frame buffer 613, and thus the PMU 614 controls the power mode of the application processor 610 such that corresponding powers are supplied to the power domains associated with transmitting the image signal to the display device 640 and the powers are gated or cut-off to the power domain not associated with transmitting the image signal to the display device 640.

The display device 640 displays images provided from the application processor 610. For example, the display device 640 may include a liquid crystal display (LCD) device, a light emitting diode (LED) display device, an organic LED (OLED) display device, a field emission display (FED) device, etc.

The memory device 620 may store data required to operate the electronic device 600. For example, the memory device 620 may include a volatile memory, e.g., a dynamic random access memory DRAM, a static RAM SRAM, a mobile DRAM, or a nonvolatile memory, e.g., an electrically erasable programmable read-only memory (EEPROM), a flash memory, a phase-change memory PRAM, a resistive random access memory RRAM, a magneto-resistive random access memory MRAM, a ferroelectric random access memory FRAM, a nano floating gate memory (NFGM), a polymer random access memory (PoRAM), etc.

The storage device 630 may include a solid state drive, a hard disk drive and a CD-ROM. The I/O device 650 may include an input tool, such as a keyboard, a keypad or a mouse, and an output tool, such as a printer. The power supply 660 may supply operating voltage required to operate the electronic device 600.

The electronic device 600 and/or components of the electronic device 600 are packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

The electronic device 600 is any mobile system, such as a mobile phone, a smart phone, a tablet computer, a laptop computer, a personal digital assistant PDA, a portable multimedia player PMP, a digital camera, a portable game console, a music player, a camcorder, a video player, a navigation system, etc.

Although not illustrated in FIG. 18, the electronic device 600 may further include a plurality of ports for communicating with a video card, a sound card, a memory card, a universal serial bus (USB) device, other electric devices, etc. In addition, the electronic system 400 may further include a baseband chipset, an application chipset, an image sensor, etc.

Figure 19:
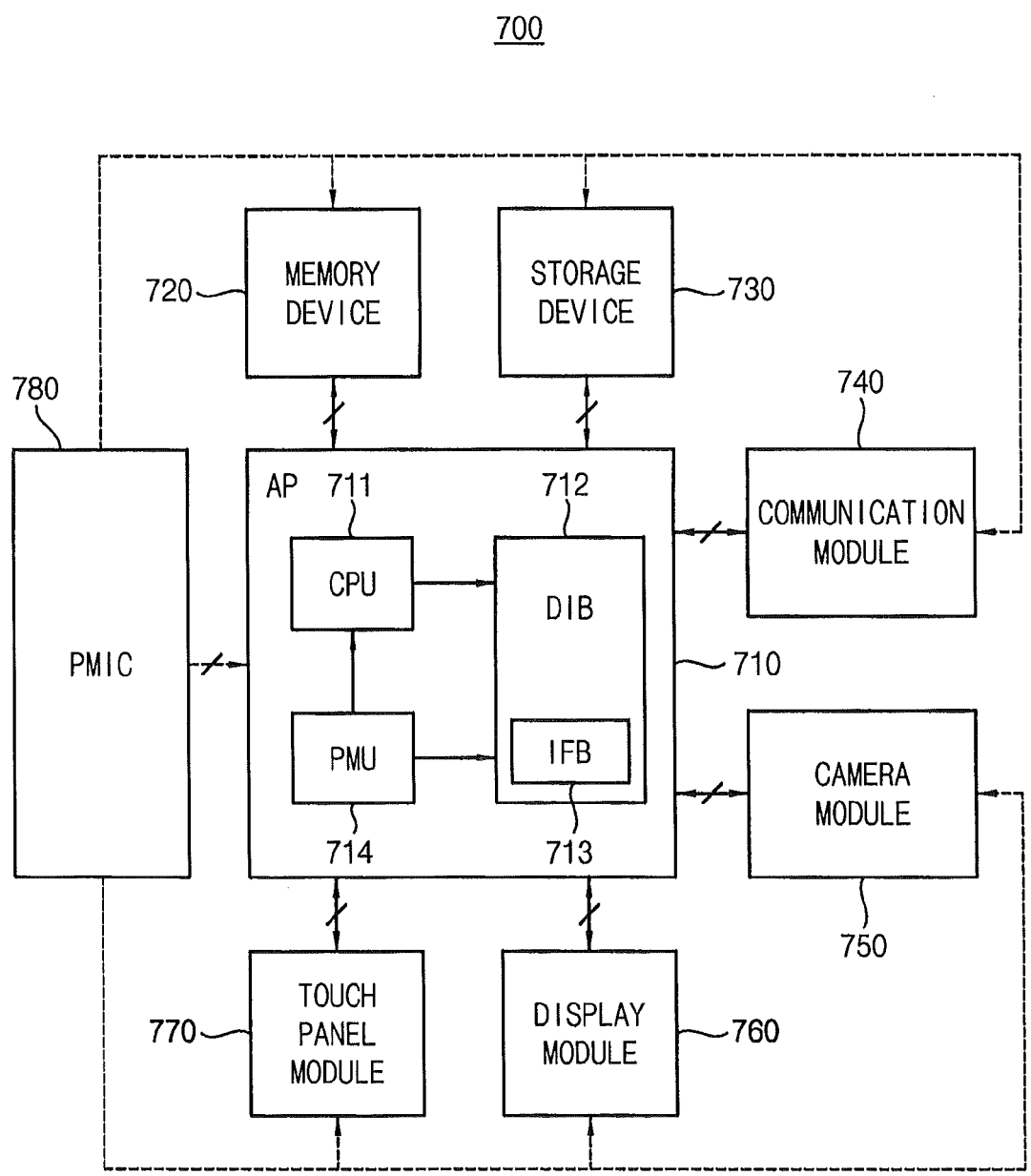
FIG. 19 is a block diagram illustrating a mobile device according to some example embodiments.

FIG. 19 is a block diagram illustrating a mobile device according to some example embodiments.

Figure 20:
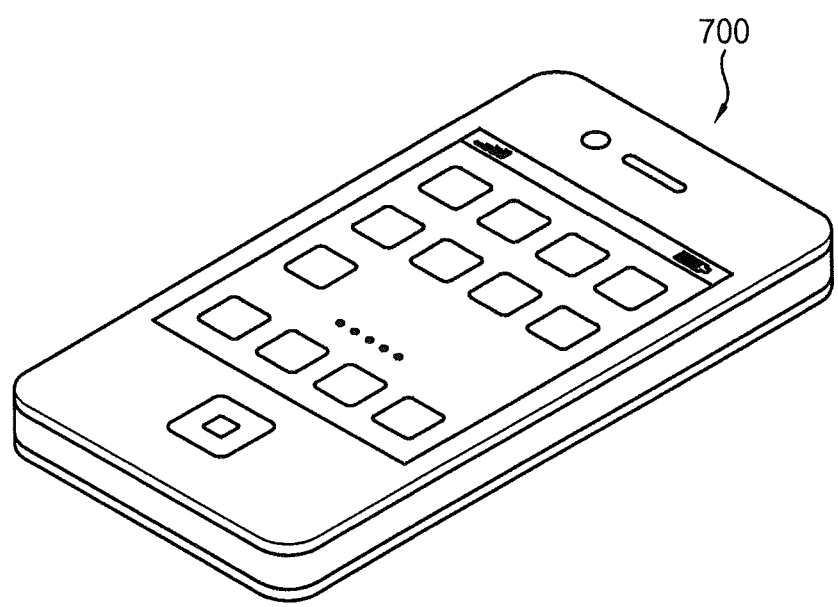
FIG. 20 is a diagram illustrating an example in which a mobile device of FIG. 19 is implemented as a smart-phone.

FIG. 20 is a diagram illustrating an example in which a mobile device of FIG. 19 is implemented as a smart-phone.

Referring to FIGS. 19 and 20, a mobile device 700 comprises an application processor 710, a memory device 720, a storage device 730, multiple functional modules 740, 770, 760, and 770, and a power management integrated circuit (PMIC) 780 that provides an operating voltage to application processor 710, memory device 720, storage device 730, and functional modules 740, 750, 760, and 770, respectively. For example, as illustrated in FIG. 20, mobile device 700 may be implemented as a smart-phone.

The application processor 710 controls overall operations of mobile device 700. For instance, application processor 710 controls memory device 720, storage device 730, and functional modules 740, 750, 760, and 770. The application processor 710 may be implemented in the form of one chip in which a CPU core 711, a display block 712 including an internal frame buffer 614 and a PMU 714 are integrated. The application processor 710 may be identical to the application processor 100 of FIG. 2.

The application processor 710, as described above, operates in the normal mode when an image signal to be displayed on the display module 760 is a moving image signal and operates in one of the first and second low power modes based on a feature of a still image signal and a power control overhead index when an image signal to be displayed on the display module 760 is a still image signal, thereby to reduce power consumption. The PMU 714 controls a power mode of power domains of the application processor 710 such that the power domains operate in one of the low power modes having different power depths with respect to each other when the an image signal to be displayed on the display module 760 is a still image signal. The power control overhead index may be based on time required for the application processor 710 to transition from each of a plurality of low power modes to the normal mode. When the application processor 710 operates in the first low power mode, portion of the image signal stored in the memory device 720 is copied to the internal frame buffer 713. When the portion of the image signal copied to the internal frame buffer 713 is consumed to a predetermined reference amount, a display controller in the display block 712 activates a trigger signal to the PMU 714. The PMU 714 controls the power mode of the application processor 710 such that corresponding powers are supplied to the power domains associated with copying the portion of the image signal to the internal frame buffer 713 and the powers are gated or cut-off to the power domain not associated with the copying operation, in response to the activated trigger signal. When the application processor 710 operates in the second low power mode, the image signal stored in the memory device 720 is transmitted to the display module 760 without using the internal frame buffer 713, and thus the PMU 714 controls the power mode of the application processor 710 such that corresponding powers are supplied to the power domains associated with transmitting the image signal to the display module 760 and the powers are gated or cut-off to the power domain not associated with transmitting the image signal to the display module 760.

Memory device 720 and storage device 730 store data for operations of mobile device 700. Memory device 720 may correspond to a volatile semiconductor memory device such as a dynamic random access memory (DRAM) device, a static random access memory (SRAM) device, a mobile DRAM, etc. In addition, storage device 730 may correspond to a non-volatile semiconductor memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. In some embodiments, storage device 730 may correspond to a solid state drive (SSD) device, a hard disk drive (HDD) device, a CD-ROM device, etc.

The PMIC 780 manages the power of the mobile device 780.

The functional modules 740, 750, 760, and 770 perform various functions of mobile device 700. For example, mobile device 700 may comprise a communication module 740 that performs a communication function (e.g., a code division multiple access (CDMA) module, a long term evolution (LTE) module, a radio frequency (RF) module, an ultra wideband (UWB) module, a wireless local area network (WLAN) module, a worldwide interoperability for microwave access (WIMAX) module, etc), a camera module 750 that performs a camera function, a display module 760 that performs a display function, a touch panel module 770 that performs a touch sensing function, etc. In some embodiments, mobile device 700 further comprises a global positioning system (GPS) module, a microphone (MIC) module, a speaker module, a gyroscope module, etc. However, a kind of the functional modules 740, 750, 760, and 770 in mobile device 700 is not limited thereto.

Figure 21:
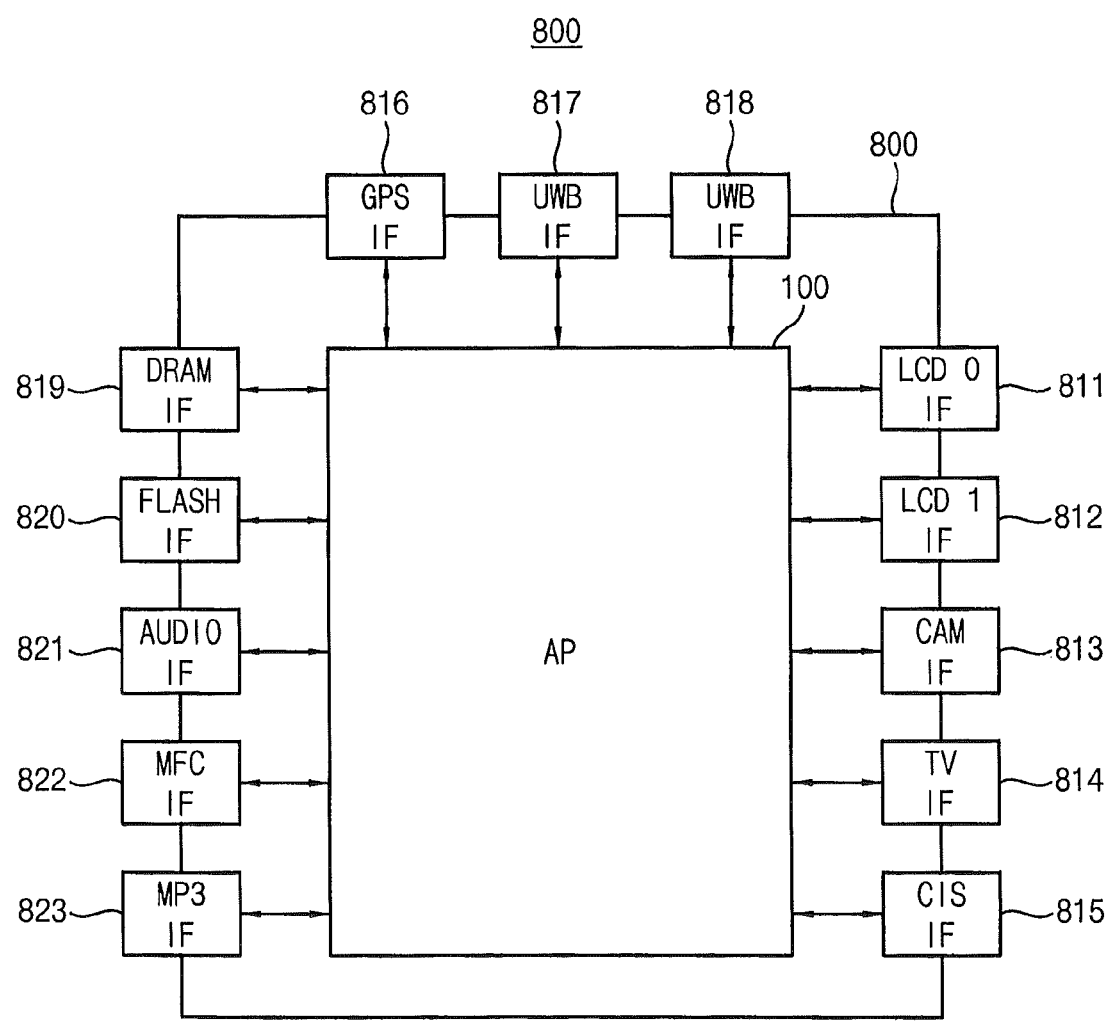
FIG. 21 is a block diagram illustrating an electronic device including the application processor of FIG. 2 according to some example embodiments.

FIG. 21 is a block diagram illustrating an electronic device including the application processor of FIG. 2 according to some example embodiments.

Referring to FIGS. 2 and 21, an electronic device 800 may be embodied in a personal computer (PC), a laptop computer, a mobile phone, a smart phone, a tablet PC, a personal digital assistant (PDA), and/or a portable multimedia player (PMP).

The electronic device 800 includes the application processor 100 and a plurality of interfaces 811 to 823. The CPU core of the application processor 100 controls a general operation of the electronic device 800.

The application processor 100 may communicate with each of a plurality of peripheral devices through each of a plurality of interfaces 811 to 823. For example, each of the plurality of interfaces 811 to 823 may transmit at least one control signal, which is output from a corresponding FC among a plurality of FC s embodied in each of power domains to each of the plurality of peripheral devices.

For example, the application processor 100 may control a power state and an operation state of each flat panel display device through each display interface 811 and 812. The flat display device includes a liquid crystal device (LCD) display, a light emitting diode (LED) display, an organic light emitting diode (OLED) display or an active matrix organic light-emitting diode (AMOLED) display. As described above, the application processor 100 operates in the normal mode when an image signal to be displayed on the flat panel display device is a moving image signal and operates in one of the first and second low power modes based on a feature of a still image signal and a power control overhead index when an image signal to be displayed on the flat panel display device is a still image signal, thereby to reduce power consumption. The PMU in the application processor 100 controls a power mode of power domains of the application processor 100 such that the power domains operate in one of the low power modes having different power depths with respect to each other when the an image signal to be displayed on the flat panel display device is a still image signal. The power control overhead index may be based on time required for the application processor 100 to transition from each of a plurality of low power modes to the normal mode.

The application processor 100 may control a power state and an operation state of a camcorder through a camcorder interface 813, control a power state and an operation state of a TV module through a TV interface 814, and control a power state and an operation state of a camera module or an image sensor module through an image sensor interface 815.

The application processor 100 may control a power state and an operation state of a GPS module through a GPS interface 816, control a power state and an operation state of an ultra wideband (UWB) module through an UWB interface 817, and control a power state and an operation state of an USB drive through an USB drive interface 818.

The application processor 100 may control a power state and a operation state of dynamic random access memory (DRAM) through a DRAM interface 819, control a power state and an operation state of a non-volatile memory device, e.g., a flash memory, through a non-volatile memory interface 820, e.g., a flash memory interface, control a power state and an operation state of an audio module through an audio interface 821, control a power state of MFC through a MFC interface 822, and control a power state of a MP3 player through a MP3 player interface 823. Here, a module or an interface may be embodied in hardware or software.

As mentioned above, according to example embodiments, the application processor may reduce power consumption by controlling the power mode of power domains of the application processor such that the power domains operate in one of a plurality of low power modes having different power depths with respect to each other when an image signal to be displayed on the display panel is a still image signal.

The example embodiments may be applicable to various electronic devices including an application processor. For example, the example embodiments may be applicable to a mobile phone, a smart phone, a tablet computer, a laptop computer, a personal digital assistant PDA, a portable multimedia player PMP, a digital camera, a portable game console, a music player, a camcorder, a video player, a navigation system, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An application processor, comprising:
    a memory controller configured to control a memory that stores an image data; and
    a power management unit coupled to the memory controller;
    wherein the power management unit is configured to control a power mode of the application processor based on a characteristic of the image data, based on a comparison of memory resources of an internal frame buffer and a memory request amount of the image data, and based on a power control overhead index, wherein the power control overhead index represents a time required for the application processor to transition from a first power mode to a second power mode and wherein the internal frame buffer is included in the application processor.

2. The application processor of claim 1, further comprising an image processing block configured to process the image data for display on a display unit;
    wherein the power management unit is farther configured to control a power mode of the image processing block based on the characteristic of the image data and the power control overhead index.

3. The application processor of claim 2, wherein the power management unit is further configured to place the memory controller and the image processing block into a first low power mode or a second low power mode in response to determining that the image data represents a still image.

4. The application processor of claim 3, wherein the application processor comprises a display control block including a display controller and the internal frame buffer, wherein in the first low power mode, the display control block routes the image signal data to the display unit through the internal frame buffer, and wherein in the second low power mode, the display control block routes the image signal data directly to the display unit bypassing the internal frame buffer.

5. The application processor of claim 2, wherein the memory controller is coupled to a first power bus by a first transistor and the image processing block is coupled to a second power bus by a second transistor, and wherein the power management unit is configured to switch the first transistor and/or the second transistor based on the selected power mode of the image processing block and the memory controller.

6. The application processor of claim 2, wherein the memory controller belongs to a first power domain and the image processing block belongs to a second power domain that is different from the first power domain.

7. The application processor of claim 2, wherein the image data comprises a still image and wherein the power management unit is configured to control a power mode of the memory controller and the image processing block to be one of a plurality of low power modes having respective different power depths.

8. The application processor of claim 7, wherein the plurality of low power modes include a first low power mode and a second low power mode, wherein the first low power mode has a plurality of sub low power modes having respective different power depths with respect to each other, and wherein the power management unit is configured to control the power mode of the memory controller and the image processing block to be one of the second low power mode and the plurality of sub low power modes based on the characteristic of the image data and a power control overhead index.

9. The application processor of claim 2, wherein the power management unit is configured to return the power mode of the memory controller and the image processing block to a normal mode when the image data is to be updated.

10. A mobile device, comprising:
a display unit configured to display an image data;
a memory configured to store the image data; and
an application processor configured to transmit the image data to the display unit;
wherein the application processor comprises:
 a memory controller configured to control the memory; and
 a power management unit coupled to the memory controller;
 wherein the power management unit is configured to control a power mode of the application processor based on a characteristic of the image data, based on a comparison of memory resources of an internal frame buffer and a memory request mount of the image data and based on a power control overhead index wherein the waver control overhead index represents a time required for the application processor to transition from a first power mode to a second power mode and wherein the internal frame buffer is included in the application processor.

11. The mobile device of claim 10, further comprising an image processing block configured to process the image data for display on a display unit;
wherein the power management unit is configured to control a power mode of the image processing block based on the characteristic of the image data and the power control overhead index.

12. A method of operating an application processor including a memory controller that controls a memory that stores an image data, the method comprising:
determining a characteristic of the image data;
determining a power control overhead index wherein the power control overhead index represents a time required for the application processor to transition from a first power mode to second power mode; and
controlling a power mode of the application processor in response to the characteristic of the image data based on a comparison of memory resources of an internal frame buffer and a memory request amount of the image data and based on the power control overhead index, wherein the internal frame buffer is included in the processor.

13. The method of claim 12, further comprising:
controlling a power mode of an image processing block based on the characteristic of the image data and the power control overhead index.

14. The method of claim 13, further comprising:
placing the memory controller and the image processing block into a first low power mode or a second low power mode in response to determining that the image data represents a still image.

15. The method of claim 14, further comprising routing the image data to a display unit through an internal frame buffer when the memory controller and the image processing block are in the first low power mode, and routing the image data directly to the display unit bypassing the internal frame buffer when the memory controller and the image processing block are in the second low power mode.

16. The method of claim 13, wherein the memory controller is coupled to a first power bus by a first transistor and the image processing block is coupled to a second power bus by a second transistor, wherein the method further comprises:
switching the first transistor and/or the second transistor based on the selected power mode of the image processing block and the memory controller.

17. The method of claim 13, wherein the image data comprises a still image and wherein the method further comprises controlling a power mode of the memory controller and the image processing block to be one of a plurality of low power modes having respective different power depths.

18. The method of claim 17, wherein the plurality of low power modes include a first low power mode and a second low power mode, wherein the first low power mode has a plurality of sub low power modes having respective different power depths with respect to each other, and wherein the method further comprises controlling the power mode of the memory controller and the image processing block to be one of the second low power mode and the plurality of sub low power modes based on the characteristic of the image data and a power control overhead index.

* * * * *